US008657307B2

(12) United States Patent
Lifshitz et al.

(10) Patent No.: US 8,657,307 B2
(45) Date of Patent: Feb. 25, 2014

(54) MODULAR ROLLING CONTAINER ASSEMBLY

(75) Inventors: Omri Lifshitz, Tel Aviv (IL); Elad Hay Shitrit, Tel Aviv (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 303 days.

(21) Appl. No.: 13/166,377

(22) Filed: Jun. 22, 2011

(65) Prior Publication Data

US 2012/0326406 A1 Dec. 27, 2012

(51) Int. Cl.
*B62B 1/00* (2006.01)

(52) U.S. Cl.
USPC .................. 280/47.18; 280/47.17; 280/47.19; 280/47.34

(58) Field of Classification Search
USPC .................. 280/47.131, 47.11, 24, 26, 47.17, 280/47.18, 3, 79.11; 312/107–109; 224/575, 153, 576; 190/18 A, 103–110
See application file for complete search history.

(56) References Cited

U.S. PATENT DOCUMENTS

| | | | | |
|---|---|---|---|---|
| 3,239,298 | A | | 3/1966 | McCarthy |
| 4,619,363 | A | | 10/1986 | Wolfseder |
| 4,653,820 | A | | 3/1987 | Tazaki |
| 4,823,955 | A | * | 4/1989 | Apps ............................ 206/506 |
| 5,011,013 | A | | 4/1991 | Meisner et al. |
| 5,176,281 | A | | 1/1993 | Fiore |
| 5,244,265 | A | | 9/1993 | Chiang |
| 5,292,191 | A | | 3/1994 | Slivon |
| 5,388,902 | A | | 2/1995 | Huebschen et al. |
| 5,403,139 | A | | 4/1995 | Slivon et al. |
| 5,518,139 | A | | 5/1996 | Trower et al. |
| 5,575,401 | A | | 11/1996 | Trower et al. |
| 5,699,925 | A | | 12/1997 | Petruzzi |
| 5,934,466 | A | | 8/1999 | Loeffler |
| 6,170,839 | B1 | | 1/2001 | Kizewski |
| 6,176,559 | B1 | | 1/2001 | Tiramani et al. |

(Continued)

FOREIGN PATENT DOCUMENTS

| | | |
|---|---|---|
| DE | 8912526 | 2/1990 |
| DE | 202004012809.8 | 10/2004 |

(Continued)

OTHER PUBLICATIONS

Examination Report as issued for New Zealand Patent Application No. 600715, dated Jun. 22, 2012.

*Primary Examiner* — John Walters
*Assistant Examiner* — James Triggs
(74) *Attorney, Agent, or Firm* — Pillsbury Winthrop Shaw Pittman LLP

(57) ABSTRACT

An apparatus for transporting articles having at least one container module that includes a container top having a non-releasable connection portion and a storage container that is selectively non-releasably connected to the container top and/or at least one other storage container. The storage container includes an upper non-releasable connection portion and a lower non-releasable connection portion. The upper non-releasable connection portion is selectively non-releasably connected to 1) a lower non-releasable connection portion of the at least one other storage container or 2) the non-releasable connection portion of the container top. The lower non-releasable connection portion is selectively non-releasably connected to an upper non-releasable connection portion of the at least one other storage container. The container module also includes a latch that releasably connects the storage container to the at least one other storage container if positioned on the container top.

39 Claims, 19 Drawing Sheets

(56) References Cited

U.S. PATENT DOCUMENTS

| | | | | |
|---|---|---|---|---|
| 6,347,847 | B1 * | 2/2002 | Tiramani et al. | 312/108 |
| 6,371,320 | B2 | 4/2002 | Sagol | |
| 6,527,353 | B1 | 3/2003 | Bradfish et al. | |
| 6,601,930 | B2 | 8/2003 | Tiramani et al. | |
| 6,637,592 | B1 | 10/2003 | Lai | |
| 6,761,366 | B1 | 7/2004 | Klemmensen et al. | |
| 6,840,376 | B2 | 1/2005 | Chen | |
| 6,874,634 | B2 | 4/2005 | Riley | |
| 6,889,838 | B2 | 5/2005 | Meier et al. | |
| 6,997,527 | B2 | 2/2006 | Cheng | |
| 7,219,969 | B2 | 5/2007 | Bezzubov | |
| 7,367,571 | B1 * | 5/2008 | Nichols | 280/47.18 |
| 7,472,730 | B2 | 1/2009 | Adkins | |
| 7,503,569 | B2 * | 3/2009 | Duvigneau | 280/47.18 |
| 7,780,026 | B1 | 8/2010 | Zuckerman | |
| 7,832,584 | B2 | 11/2010 | Eggers et al. | |
| 7,845,653 | B2 | 12/2010 | Katz | |
| 7,883,096 | B2 | 2/2011 | Katz et al. | |
| 7,938,412 | B2 | 5/2011 | Katz | |
| 2006/0152117 | A1 | 7/2006 | Goetsch et al. | |
| 2007/0194543 | A1 | 8/2007 | Duvigneau | |
| 2007/0222231 | A1 | 9/2007 | Vilkomirski | |
| 2008/0121547 | A1 | 5/2008 | Dur et al. | |
| 2010/0108549 | A1 | 5/2010 | Eggers et al. | |
| 2010/0224527 | A1 | 9/2010 | Huang | |
| 2010/0224528 | A1 | 9/2010 | Madsen | |
| 2010/0290877 | A1 | 11/2010 | Landau et al. | |
| 2011/0049824 | A1 | 3/2011 | Bar-Erez et al. | |

FOREIGN PATENT DOCUMENTS

| | | |
|---|---|---|
| DE | 202004020112 | 2/2005 |
| DE | 202005000097.3 | 3/2005 |
| DE | 202005006268.5 | 6/2005 |
| DE | 202005014819.9 | 2/2006 |
| DE | 202006002177.9 | 4/2006 |
| DE | 202006013869.2 | 11/2006 |
| DE | 102007027012.9 | 1/2008 |
| DE | 202009002082 | 8/2009 |
| EP | 0 555 533 | 8/1993 |
| EP | 0 933 170 | 8/1999 |
| EP | 1 305 145 | 5/2003 |
| EP | 1 340 598 | 9/2003 |
| EP | 1 424 170 | 6/2004 |
| EP | 1 516 703 | 3/2005 |
| EP | 1 563 965 | 8/2005 |
| EP | 1 724 069 | 11/2006 |
| EP | 2 133 180 | 12/2009 |
| EP | 2 253 432 | 11/2010 |
| GB | 2 445 216 | 7/2008 |
| JP | 4309959 | 8/2009 |

* cited by examiner

MODULAR ROLLING CONTAINER ASSEMBLY

FIELD OF THE INVENTION

The present invention relates to a rolling container assembly.

BACKGROUND OF THE INVENTION

Rolling container assemblies are commonly used to carry a plurality of working tools to and from a working location. There is a need in the art for an improved rolling container assembly with enhanced modularity attributes.

SUMMARY OF THE INVENTION

One aspect of the invention provides a container module that includes a container top having a non-releasable connection portion and a storage container constructed and arranged to be selectively non-releasably connected to the container top or at least one other storage container. The storage container includes an upper non-releasable connection portion and a lower non-releasable connection portion. The upper non-releasable connection portion is constructed and arranged to be selectively non-releasably connected to 1) a lower non-releasable connection portion of the at least one other storage container or 2) the non-releasable connection portion of the container top. The lower non-releasable connection portion is constructed and arranged to be selectively non-releasably connected to an upper non-releasable connection portion of the at least one other storage container. The container module also includes a latch constructed and arranged to releasably connect the storage container to the at least one other storage container if positioned on the container top.

Another aspect provides an apparatus for transporting articles between working locations that includes one or more rotatable ground engaging wheels mounted toward the bottom of the apparatus for rotation about an axis to provide rolling support for the apparatus. The apparatus also includes at least two storage containers constructed and arranged to be selectively releasably or non-releasably connected to one another. Each storage container includes an upper non-releasable connection portion and a lower non-releasable connection portion. The upper non-releasable connection portion of one of the storage containers is constructed and arranged to be selectively non-releasably connected to the lower non-releasable connection portion of the other of the storage containers, and the lower non-releasable connection portion of the one of the storage containers is constructed and arranged to be selectively non-releasably connected to the upper non-releasable connection portion of the other of the storage containers. The apparatus also includes a container top having a non-releasable connection portion constructed and arranged to be selectively non-releasably connected to the upper non-releasable connection portion of either of the storage containers. The connection between the non-releasable connection portion of the container top and the upper non-releasable connection portion of one of the storage containers 1) prevents the one of the storage containers that is non-releasably connected to the container top from being non-releasably connected to the other of the storage containers disposed above the container top and 2) permits the one of the storage containers that is non-releasably connected to the container top to be releasably connected to the other of the storage containers disposed above the container top. The apparatus further includes a releasable latch that releasably latches the one of the storage containers that is non-releasably connected to the container top to be releasably connected to the other of the storage containers disposed above the container top. The apparatus also includes a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

Another aspect provides a container having a container portion and a storage portion constructed and arranged to be received in the container portion. The drawer is moveable between an open position wherein access to contents of the storage portion is permitted and a closed position wherein access to the contents of the storage portion is prevented. The storage portion includes a front wall, a rear wall, and side walls. The front wall includes a latch shield engageable by the user to push the storage portion from the open position to the closed position. The storage portion also includes a latch member at least partially shielded by the latch shield and constructed and arranged to latch the storage portion in the closed position. The latch member includes an engaging portion constructed and arranged to engage with a latch engaging member. The engaging portion is biased upwards in a first position wherein the engaging portion is engageable with the latch engaging member to latch the storage portion in the closed position. Movement of the storage portion from the open position to the closed position effects engagement of the engaging portion with the latch engaging member. The latch member also includes an actuating portion actuatable by the user to move the engaging portion downward to a second position wherein the latch member is releasable from engagement with the latch engaging member to permit movement of the storage portion.

Another aspect provides an apparatus for transporting articles between working locations. The apparatus includes at least one container having an interior space in which articles to be transported can be stored. The apparatus also includes one or more rotatable ground engaging wheels mounted toward the bottom of the apparatus for rotation about an axis to provide rolling support for the apparatus. The apparatus also includes an adjustable pulling handle slideable between a retracted position and an extended position. The pulling handle and the one or more ground engaging wheels are arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction. The apparatus also includes a rocker lock constructed and arranged to be moveable between 1) a locked position wherein the pulling handle is locked at a selected position such that sliding movement of the pulling handle between the retracted position and the extended position is prevented and 2) an unlocked position wherein sliding movement of pulling handle between the retracted position and the extended position is permitted. The rocker lock has a first portion and a second portion. The rocker lock has a pivot axis provided between the first portion and the second portion, a biasing member that biases the rocker lock towards the locked position and is actuatable against the bias of the biasing member to pivot the rocker lock to the unlocked position. and wherein the second portion is constructed and arranged to lock the pulling handle when the rocker lock is in the locked position.

Another aspect provides a container module that includes a container top having a non-releasable connection portion of a first type and a storage container having an upper portion with a non-releasable connection portion of a second type, which is non-releasably connectable with the non-releasable connection portion of the first type so that the upper portion can be connected to the container top. The storage container has a lower portion with a) a non-releasable connection portion of the first type to enable the lower portion to be non-releasably connected to an upper portion of at least one other storage container, and b) a releasable connection portion. The container module also includes a releasable latch enabling a releasable connection of the storage container to the at least one other storage container.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

DETAILED DESCRIPTION OF THE INVENTION

Figure 1A:
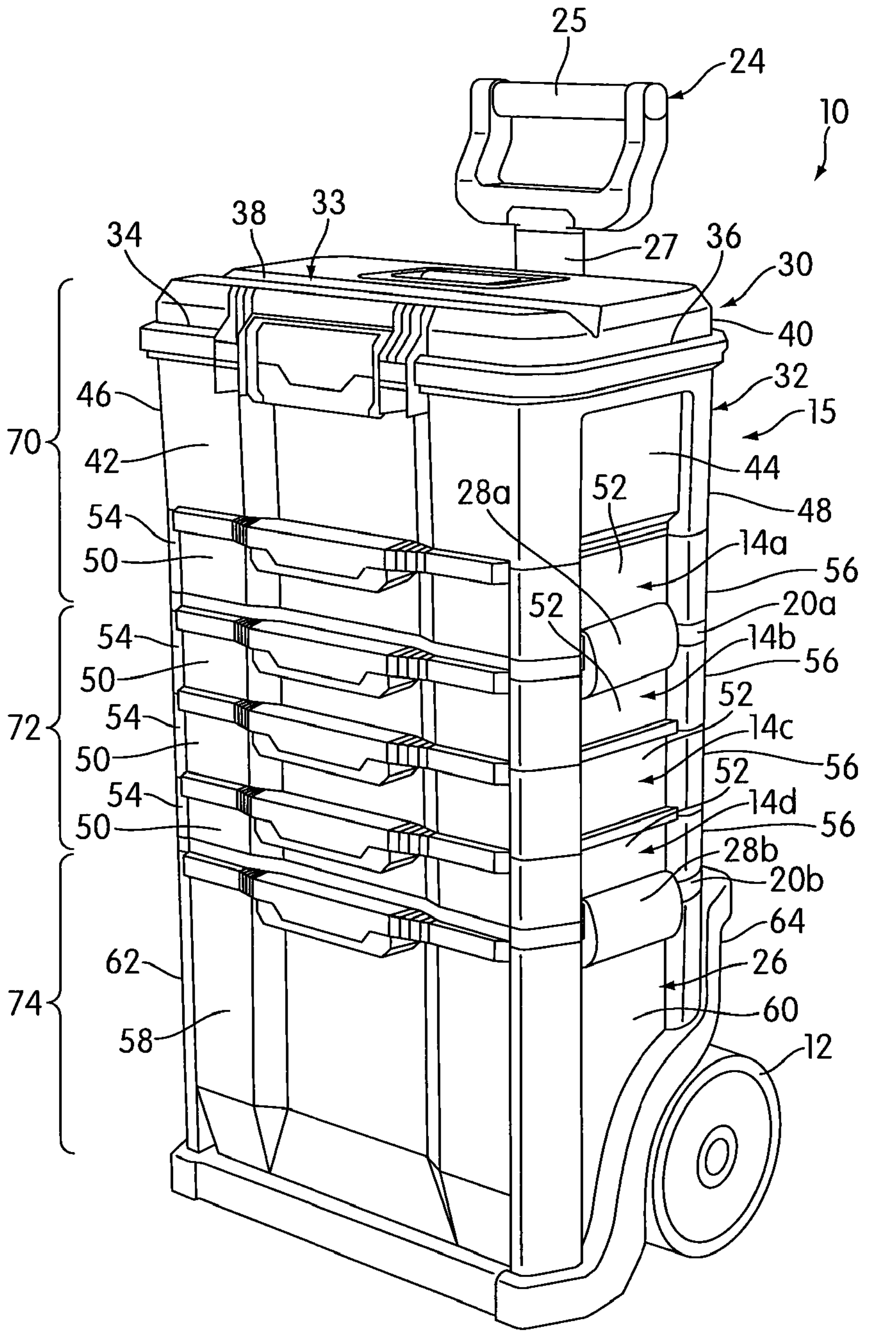
FIG. 1*a* is a perspective front view of a rolling container assembly in accordance with an embodiment of the present invention.

FIG. 1*a* shows an apparatus 10 for transporting articles between working locations. The apparatus 10 has one or more rotatable ground engaging wheels 12 mounted toward the bottom of the apparatus 10 for rotation about an axis to provide rolling support for the apparatus 10. The apparatus 10 also has at least two storage containers 14*a*, 14*b*, 14*c*, 14*d* (four are shown in this embodiment of FIG. 1*a*) constructed and arranged to be selectively releasably or non-releasably connected to one another. Each storage container 14*a*-14*d* includes an upper non-releasable connection portion 16 (see FIG. 8*a*) and a lower non-releasable connection portion 18 (see FIG. 8*a*). The upper non-releasable connection portion 16 of one of the storage containers 14*a*-14*d* is constructed and arranged to be selectively non-releasably connected to the lower non-releasable connection portion 18 of the other of the storage containers 14*a*-14*d*. In addition, the lower non-releasable connection portion 18 of the one of the storage containers 14*a*-14*d* is constructed and arranged to be selectively non-releasably connected to the upper non-releasable connection portion 16 of the other of the storage containers 14*a*-14*d*. Referring back to FIG. 1*a*, the apparatus 10 may also include a top storage container 15 that is selectively releasably or non-releasably connected to one of the storage containers 14*a*-14*d*. In one embodiment, the top storage container 15 includes a non-releasable connection portion (not shown) constructed and arranged in a similar manner as the lower non-releasable connection portion 18 of the storage containers 14*a*-14*d*, wherein the non-releasable connection portion of the top storage container 15 may be selectively non-releasably connected to an upper non-releasable connection portion 16 of one of the storage containers 14*a*-14*d*. For example, in the illustrated embodiment of FIG. 1*a*, the top storage container 15 is non-releasably connected to the storage container 14*a*. The releasable connections may be provided by pairs of latches 28*a*, 28*b* (the other latches 28*a*, 28*b* of each pair of latches 28*a*, 28*b* are obstructed from view in this Figure).

Figure 1B:
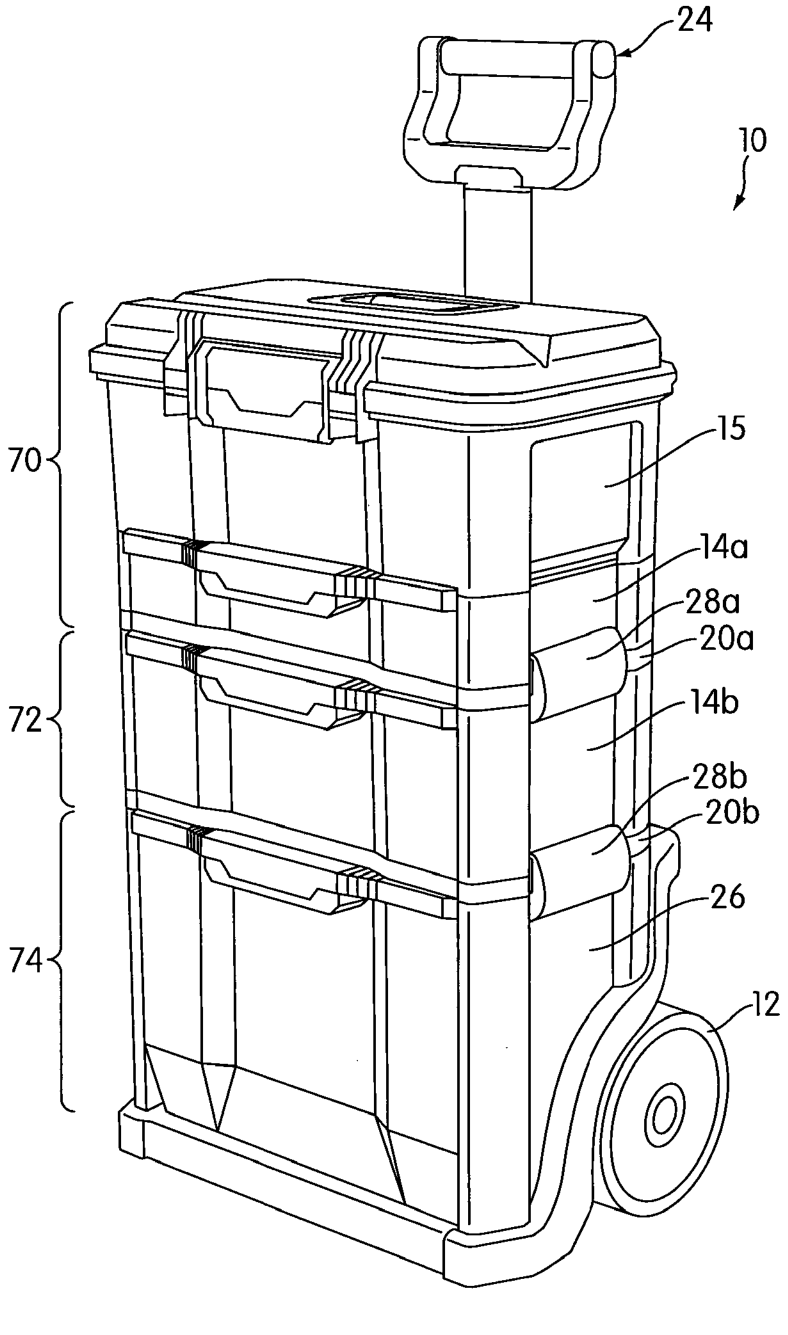
FIG. 1*b* is a perspective front view of a rolling container assembly in accordance with another embodiment of the present invention.

In the embodiment of FIG. 1*b*, the apparatus 10 also includes a container top 20*a*, 20*b* (two are shown in this embodiment). It should be appreciated that the number and location of the container tops 20*a*, 20*b* may vary in other embodiments. The container tops 20*a*, 20*b* has a non-releasable connection portion 22 (see FIG. 9*b*) constructed and arranged to be selectively non-releasably connected to the upper non-releasable connection portion 16 of one of the storage containers 14*a*-14*d*. The connection between the non-releasable connection portion 22 of the container tops 20*a*, 20*b* and the upper non-releasable connection portion 16 of one of the storage containers 14*a*-14*c* 1) prevents the one of the storage containers 14*a*-14*d* that is non-releasably connected to the container top 20*a*, 20*b* from being non-releasably connected to the other of the storage containers 14*a*-14*d* disposed above the container top 20*a*, 20*b* and 2) permits the one of the storage containers 14*a*-14*d* that is non-releasably connected to the container top 20*a*, 20*b* to be releasably connected to the other of the storage containers 14*a*-14*d* disposed above the container top 20*a*, 20*b*. In the illustrated embodiment of FIG. 1*a*, the container top 20*a* is releasably connected to the storage container 14*b* such that the container top 20*a* 1) prevents the storage container 14*b* from being non-releasably connected to the storage container 14*a* and 2) permits the storage container 14*b* to be releasably connected to the storage container 14*a* disposed above the container top 20*a*.

The non-releasable connection portions 22 of the container tops 20*a*, 20*b* and the lower non-releasable connection portion 18 of the storage containers 14*a*-14*d* may be a first type of non-releasable connection portion different from a second type of connection portion defined by the upper non-releasable connection portion 16 of the storage containers 14*a*-14*d*. Just for example, in one embodiment, the first type of connection portion may be a female type connector, and the second type of connection portion may be male type connector configured to be connected to the female type connector. However, it should be appreciated that in other embodiments, the female and male types connectors may be interchanged. That is, the non-releasable connection portions 22 of the container tops 20*a*, 20*b* and the lower non-releasable connection portions 18 of the storage containers 14*a*-14*d* may be male type connectors, and the upper non-releasable connection portion 16 of the storage containers 14*a*-14*d* may be female type connectors.

In one embodiment, the apparatus 10 also includes a base storage container 26 that is selectively releasably or non-releasably connected to one of the storage containers 14*a*-14*d*. In one embodiment, the base storage container 26 includes a non-releasable connection portion (not shown) constructed and arranged in a similar manner as the upper non-releasable connection portion 16 of the storage containers 14*a*-14*d*, wherein the non-releasable connection portion of the base storage container 26 may be selectively non-releasably connected to a lower non-releasable connection portion 18 of one of the storage containers 14*a*-14*d* or to a non-releasable connection portion 22 of one of the container tops 20*a*, 20*b*.

In the embodiment shown in FIG. 1*a*, the top storage container 15 is non-releasably connected to the storage container 14*a* to form upper container module 70. Middle container module 72 is formed by the container top 20*a*, the storage container 14*b*, the storage container 14*c*, and the storage container 14*d* that are non-releasably connected to one another. Lower container module 74 is formed by the container top 20*b* and the base container 26 that are non-releasably connected to each other. It should be appreciated that the container modules 70, 72, 74 may have other configurations and may be formed using various combinations of one or more of the container tops 20*a*, 20*b*, storage containers 14*a*-14*d*, base storage container 26, or top storage container 15 in other embodiments. It should also be appreciated that the apparatus 10 may have other container modules formed using additional storage containers and container tops that are non-releasably connected to one another. These container modules may then be releasably connected to one another. In one embodiment, each container module includes a container top that prevents the storage container that is non-releasably connected to the container top from being non-releasably connected to another storage container disposed above the container top.

In one embodiment, the apparatus 10 also includes a manually engageable pulling handle 24. The pulling handle 24 and the one or more ground engaging wheels 12 are arranged to enable a user to manually pull the pulling handle 24 generally rearwardly so as to tilt the apparatus 10 rearwardly to a tilted rolling movement position, thereby enabling the user to roll the apparatus 10 to a desired location by pushing or pulling the pulling handle 24 in a desired direction. In the illustrated embodiment, the pulling handle 24 includes a handle portion 25 and an extension bar 27 connected to the handle portion 25. The handle portion 25 may be provided with rubber, foam, or other anti-slip materials thereon to facilitate grasping of the handle portion 25. Alternatively or additionally, grooves or other shapes may be formed on the handle portion 25 to facilitate the grasping thereof.

In the embodiment shown in FIG. 1*a*, the top storage container 15 may include a lid portion 30 and a container portion 32. The lid portion 30 may include a top side or wall 33, a front side or wall 34, a left side or wall 36, a right side or wall 38, and a rear side or wall 40. The container portion 32 may include a front side or wall 42, a left side or wall 44, a right side or wall 46, a rear side or wall 48, and a bottom side or wall (not shown). Each of the storage containers 14*a*, 14*b*, 14*c*, 14*d* may include a front side or wall 50, a left side or wall 52, a right side or wall 54, a rear side or wall 56, and a bottom side or wall 59 (see FIG. 12). Referring back to FIG. 1*a*, the base storage container 26 may include a front side or wall 58, a right side or wall 62, a left side or wall 60, a rear side or wall 64, and a bottom side or wall 66 (see FIG. 4).

FIG. 1*b* shows another embodiment of the apparatus 10 having top storage container 15, storage containers 14*a*, 14*b*, container tops 20*a*, 20*b*, and base storage container 26. In this embodiment, the top storage container 15 is non-releasably connected to storage container 14*a* to form the upper container module 70. The middle container module 72 is formed from the container top 20*a* and the storage container 14*b* that are non-releasably connected to each other. The lower container module 74 is formed from the container top 20*b* and the base storage container 26 that are non-releasably connected to each other. In this embodiment, latches 28*a*, 28*b* are used to releasably connect the upper container module 70 to the middle container module 72 and the middle container module 72 to the lower container module 74, respectively. That is, the latches 28*a* releasably connects the storage container 14*a* of the upper container module 70 to the storage container 14*b* of the middle container module 72, and the latches 28*b* releasably connects the storage container 14*b* of the middle container module 72 to the base storage container 26 of the lower container module 74.

It should be appreciated that the number, combination, and/or arrangement of storage containers, top container, container tops, and base container may vary. It should also be appreciated that the number of latches and the location of the latches may also vary. The storage containers may have the same configuration as one another or may have different configurations from one another. For example, there can be one or more storage containers of equal size or there can be one or more storage containers that are different in size compared to one or more other storage containers. In one embodiment, there can be a plurality of storage containers that can be non-releasably connected to each other in any order or configuration. As used herein, "non-releasable" does not necessarily mean that it is impossible to release the connection between parts or disconnect the parts that are non-releasably connected. Instead, the term "non-releasable" may refer to the inability of a user to disconnect a connection manually, without the use of a tool or implement. In addition, the parts that are non-releasably connected may be connected during manufacture, such as at the factory, or at any point before being sold to consumers or users. This may enable manufacturers or others to easily assemble the various embodiments of the apparatus 10 before the apparatus 10 is sold to consumers or users. In other words, the manufacturer or others assembling the various embodiments of the apparatus 10 may select the storage containers 14*a*-14*d*, base container 26, top storage container 15, and container tops 20-20*b* to be non-releasably connected to one another. The manufacturers or other assembling the apparatus 10 may also select the storage containers 14*a*-14*d* to be releasably connected to one another. Thus, the manufactures or others assembling the apparatus 10 may select the combination of storage containers 14*a*-14*d*, base container 26, top storage container 15, and container tops 20*a*-20*b* to be non-releasably or releasably connected to one other. However, in another embodiment, the parts may be non-releasably connected by consumer after being sold to the consumer. In contrast, parts that are "releasably" connected as contemplated herein are easier to disconnect from one another or release their connection from one another. That is, parts that are "releasably" connected may be released manually by the consumers or users without the use of a tool or implement.

Figure 2:
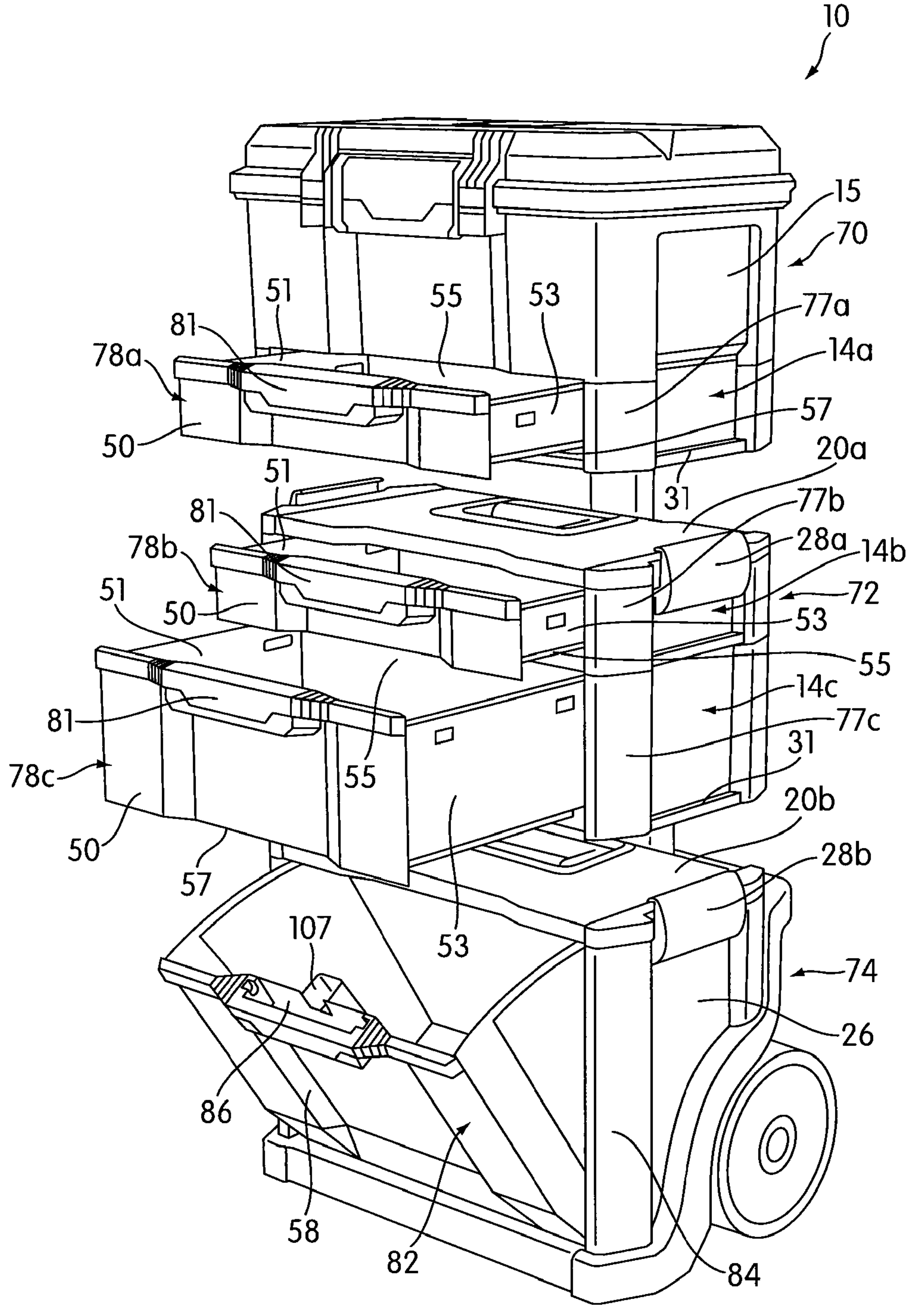
FIG. 2 is a perspective front view of a rolling container assembly in accordance with yet another embodiment of the present invention, but with container modules releasably disconnected from one another.

FIG. 2 shows an embodiment of the apparatus 10 with the container modules 70, 72, 74 that are released from their releasable connections with one another. In the illustrated embodiment, the container top 20*a* prevents the storage container 14*b* from being non-releasably connected to storage container 14*a*. Similarly, container top 20*b* prevents the base storage container 26 from being non-releasably connected to storage container 14*b*. In this embodiment, each of the storage containers 14*a*, 14*b*, 14*c* includes a container portion 77*a*, 77*b*, 77*c*, respectively. The container portions 77*a*, 77*b*, 77*c* are constructed and arranged to receive sliding drawer 78*a*, 78*b*, 78*c*, respectively, therein. The drawers 78*a*, 78*b*, 78*c* may have similar or different configurations from one another. In one embodiment, the drawers 78*a*, 78*b*, 78*c* each have the front wall or side 50, a right wall or side 51, a left wall or side 53, a rear wall or side 55, and a bottom wall or side 57. The storage containers 14*a*-14*c* may include slide rails 80 (see FIG. 14*a*) constructed and arranged to enable the drawers 78*a*-78*c* to slide thereon between an open position wherein access to contents of the drawers 78*a*-78*c* are permitted and a closed position wherein access to contents of the drawers 78*a*-78*c* are prevented. In the embodiment shown in FIG. 2, the front side 50 of each of the drawers 78*a*, 78*b*, 78*c* includes a latch shield 81 that is engageable by the user to push the drawer 78*a*-78*c* from the open position to the closed position.

The base storage container 26 may include a container portion 84 and a bin 82 received in the container portion 84. In the embodiment shown in FIG. 2, the bin 82 is pivotable between an open position wherein access to contents of the bin 82 are permitted and a closed position wherein access to contents of the bin 82 are prevented. The front side 58 of the bin 82 includes a latch shield 86 that is engageable by the user to move the bin 82 from the open position to the closed position. In other embodiments, the bin 82 may be a sliding bin or other types of bins. It is also contemplated that instead of bin 82, the base storage container 26 may include a sliding drawer. The drawers 78*a*-78*c* and the bin 82 may be referred to as storage portions.

Figure 3:
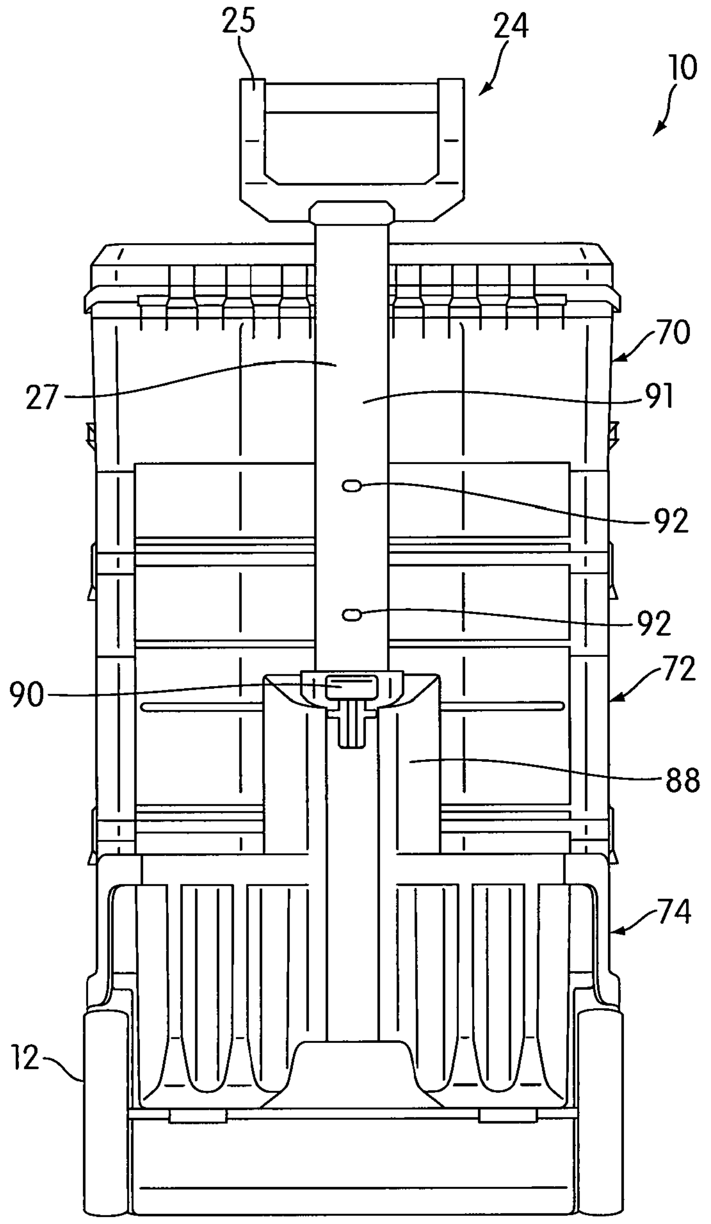
FIG. 3 is a rear plan view of the rolling container assembly in accordance with an embodiment.

FIG. 3 shows a rear view of the apparatus 10. The apparatus 10 includes a handle receiving portion 88 having an opening (not shown) constructed and arranged to telescopically receive the extension bar 27 of the pulling handle 24 such that the height of the handle portion 25 may be adjusted. That is, the pulling handle 24 may be slid between a retracted position and an extended position to adjust the height of the handle portion 25. Thus, to lower the height of the handle portion 25, the extension bar 27 may be lowered such that an increased portion of the extension bar 27 is further received in the handle receiving portion 88. In contrast, to increase the height of the handle portion 25, the extension bar 27 may be pulled upwards such that a decreased portion of the extension bar 27 is received in the handle receiving portion 88. In the illustrated embodiment, a handle lock 90, which may take the form of a rocker, is constructed and arranged to be moveable between 1) a locked position wherein the pulling handle 24 is locked at a selected position such that sliding movement of the pulling handle 24 between the retracted position and the extended position is prevented and 2) an unlocked position wherein sliding movement of the pulling handle 24 between the retracted position and the extended position is permitted. The handle lock 90 may engage with one of a plurality of openings 92 provided in an outer surface 91 of the extension bar 27 when the pulling handle 24 is in the locked position. The handle lock 90 will be described in more detail later.

Figure 4:
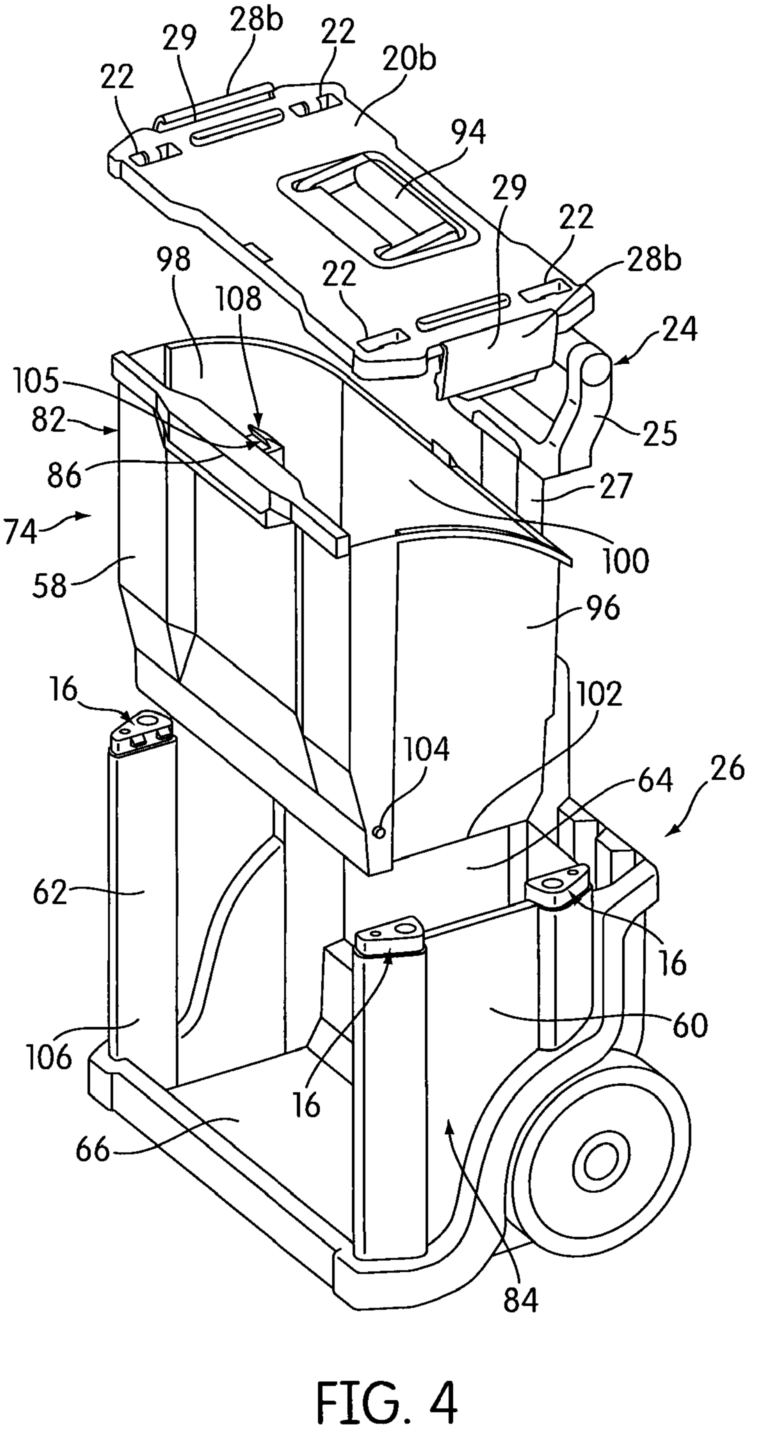
FIG. 4 is an exploded view of a base storage container and container top of the rolling container assembly in accordance with an embodiment.

FIG. 4 is an exploded view of the lower container module 74. In the illustrated embodiment, the lower container module 74 includes the container top 20*b*. The container top 20*b* may include a pivotable handle 94 provided thereon. Each latch 28*b* is pivotally connected to the container top 20*b* and constructed and arranged to be releasably connected to a latch engaging structure 31 (see for example FIG. 5) defined on a storage container 14*a*-14*d* positioned above the container top 20*b*.

In one embodiment, the bin 82 includes the front wall 58, a left side or wall 96, a right side or wall 98, a rear side or wall 100, and a bottom side or wall 102. In this embodiment, a pair of protrusions 104 (only one is shown in this Figure) are formed on the bin 82 and constructed and arranged to be received in a pair of openings 106 (only one is shown in this Figure) formed in the container portion 84 to pivotally connect the bin 82 to the container portion 84. It is contemplated that in other embodiments, the bin 82 may be connected to the container portion 84 using other attachment mechanisms.

In the illustrated embodiment, the latch shield 86 is provided on the front wall 58 of the bin 82 such that the user may engage the latch shield 86 to pivot the bin 82 to the closed position. The latch shield 86 may at least partially shield a latch member 108 that is constructed and arranged to latch the bin 82 in the closed position. An engaging portion 105 of the latch member 108 is exposed through an opening 107 (see FIG. 2 for a better view) formed in the bin 82. The engaging portion 105 is constructed and arranged to engage with a latch engaging member (not shown) to latch the bin 82 in the closed position. In this embodiment, the latch engaging member is provided on the container top 20*b*. Alternatively or additionally, the latch engaging member may be provided on the container portion 84. The latch shield 86 may be integrally molded with the rest of the bin 82 or may be attached thereto. The latch member 108 will be described in more detail later.

As shown in FIG. 4, the container portion 84 includes the upper non-releasable connection portions 16 constructed and arranged to be connected to the non-releasable connection portion 22 of the container top 20*b*. It should be appreciated that in some embodiments, the upper non-releasable connection portions 16 may be selectively non-releasably connected to the lower non-releasable connection portions 18 of a storage container.

Figure 5:
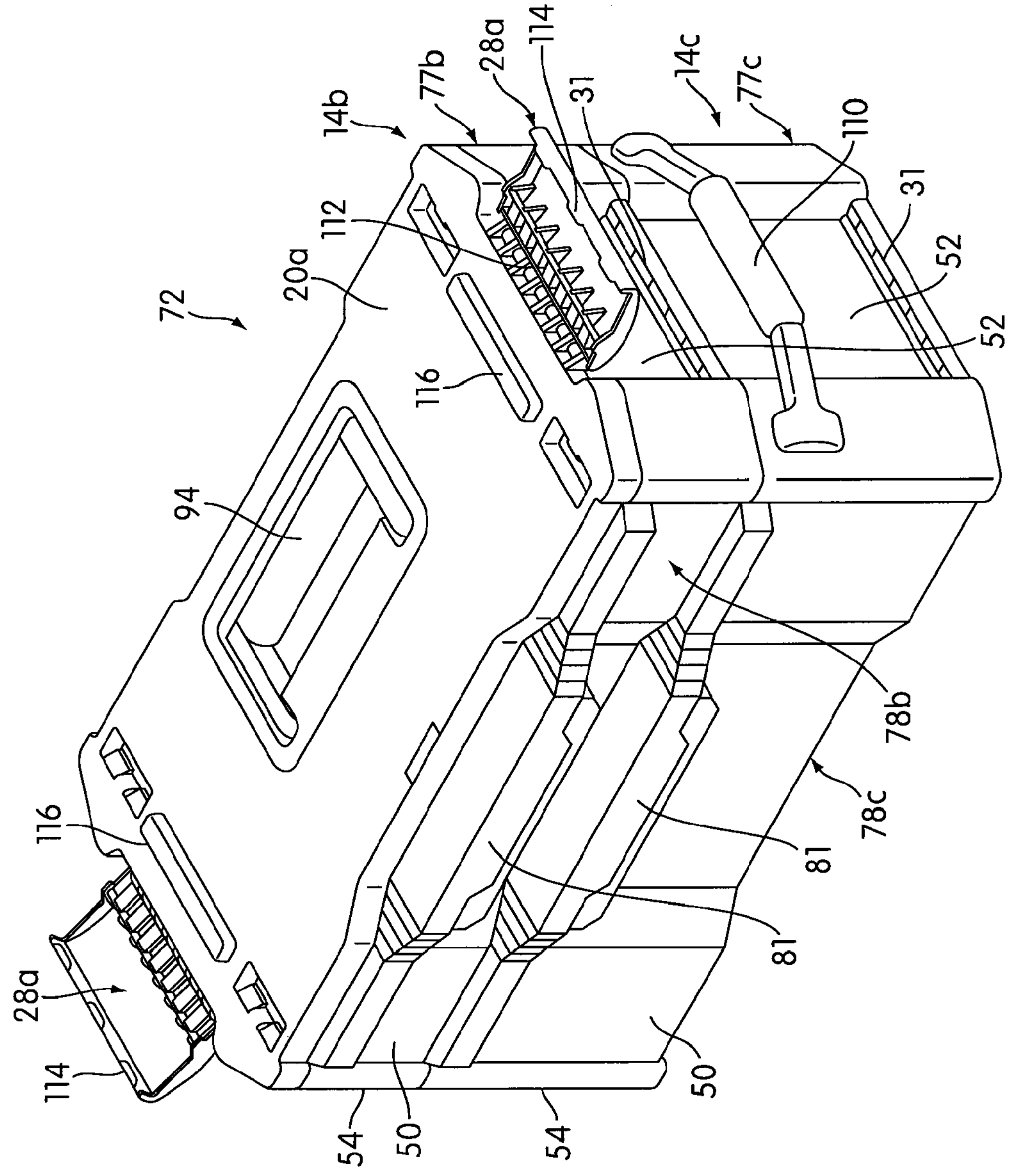
FIG. 5 is a perspective view of a container module of the rolling container assembly in accordance with an embodiment.

FIG. 5 shows a perspective view of a middle container module 72 in accordance with an embodiment. In this embodiment, the module 72 is formed by the storage container 14*b*, storage container 14*c*, and the container top 20*a* that are non-releasably connected to one another. As shown in the illustrated embodiment, the latches 28*a* are pivotally connected to the container top 20*a* by hinges 112. It should be appreciated that the latches on the other container tops may be attached to their respective container tops in a similar manner, or other connection mechanisms may be used. The latches 28*a* each includes an upper engaging member 114 constructed and arranged to engage with the latch engaging structure 31 of another storage container or the top container 15 so as to non-releasably connect the storage containers and the container tops. Thus, in one embodiment, the upper engaging member 114 of the latches 28*a* connected to the container top 20*a* may be used to engage with the latch engaging structure 31 of the storage container 14*a* to releasably connect the storage container 14*a* to the container top 20*a* and to the storage containers 14*b*, 14*c*. In one embodiment, the upper engaging member 114 may be curved inwardly or at an angle relative to the rest of the latch 28*a* such that the upper engaging member 114 may be received in the latch engaging structure 31 during the releasable connection. Latches 28*b* may have a similar configuration as latches 28*a*. However, it is contemplated that the latches 28*a*, 28*b* and the latch engaging structures may have other configurations and/or locations in other embodiments.

Optional side handles 110 may be attached to the sides 52, 54 (the side handle 110 attached to the side 54 is obstructed from view) of the storage container 14*c* to facilitate transport or placement of the container module 72. It is contemplated that the side handles 110 may have other configurations, may be placed at other locations, or may be integrally formed with storage containers.

In the illustrated embodiment, the container top 20*a* is formed with elongated protrusions 116 (two are shown in this embodiment). The elongated protrusions 116 may be constructed and arranged to be received in elongated recesses 118 (see FIG. 11*a*) formed in the bottom side of the storage containers 14*a*-14*d* to facilitate alignment of the latches 28*a* with the latch engaging structures 31. That is, when another container module is placed on top of container module 72 such that the protrusions 116 of the container module 72 are received in the recesses of the other container module, the latches 28*a* of the container top 20*a* may be aligned with the latch engaging structures 31 of the other container module so as to enable the upper engaging members of the latches 28*a* to be received in the latch engaging structure 31 to form the releasable connection between the container modules. The other container tops may have the same configuration as container top 20*a* and may include the same features.

Figure 6:
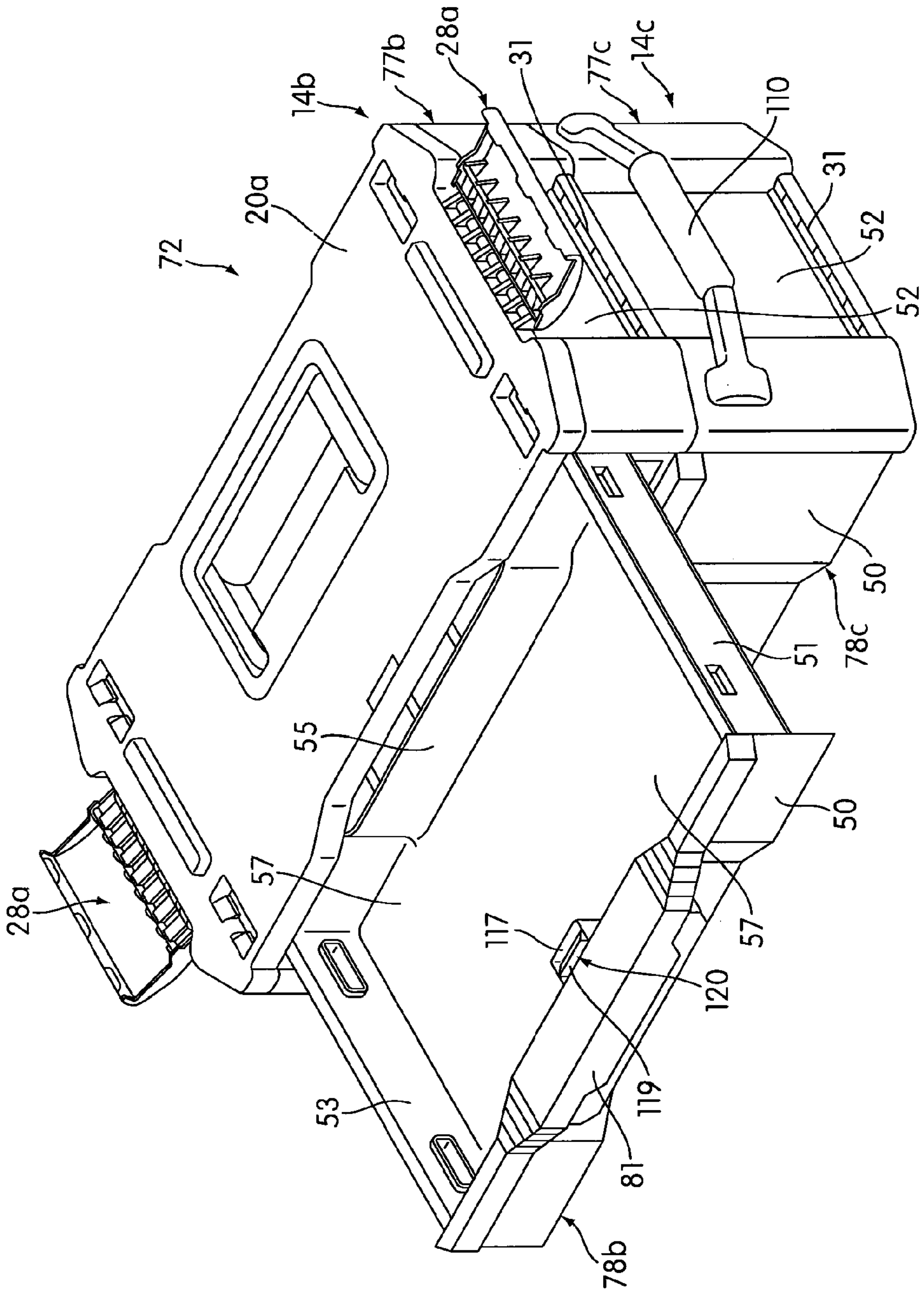
FIG. 6 is a perspective view of the container module of the rolling container assembly in accordance with an embodiment.

FIG. 6 is a perspective view of the middle container module 72 with the drawer 78*b* in the open position. The latch shield 81 may at least partially shield a latch member 120 that is constructed and arranged to latch the bin 82 in the closed position. An engaging portion 119 of the latch 120 is exposed through an opening 117 formed in the drawer 78*b*. The engaging portion 119 is constructed and arranged to engage with a latch engaging member 121 (see FIG. 13*a*) to latch the drawer 78*b* in the closed position. The latch member 120 may have the same configuration as the latch member 108 of the bin 82 of the base storage container 26, or may have a different configuration. The other storage containers may also be provided with the latch member 120. In one embodiment, the latch member 120 is biased upwards in a first position (see FIG. 13*a*) wherein the engaging portion 119 is engageable with the latch engaging member 121 to latch the drawer 78*b* in the closed position to prevent sliding movement of the drawer 78*b*. The latch member 120 may be moveable to a second position (see FIG. 13*b*) wherein the latch member 120 is releasable from engagement with the latch engaging member 121 to permit sliding movement of the drawer 78*b*. The latch engaging member 121 may be provided on the container top 20*a*. Alternatively or additionally, the latch engaging member 121 may be provided on a storage container disposed above and connected to the storage container 14*b*. It should be appreciated that the other drawers may be provided with latches having similar configuration as the latch member 120. Details of the latch member 120 and the operation thereof will be described in more detail later.

Figure 7:
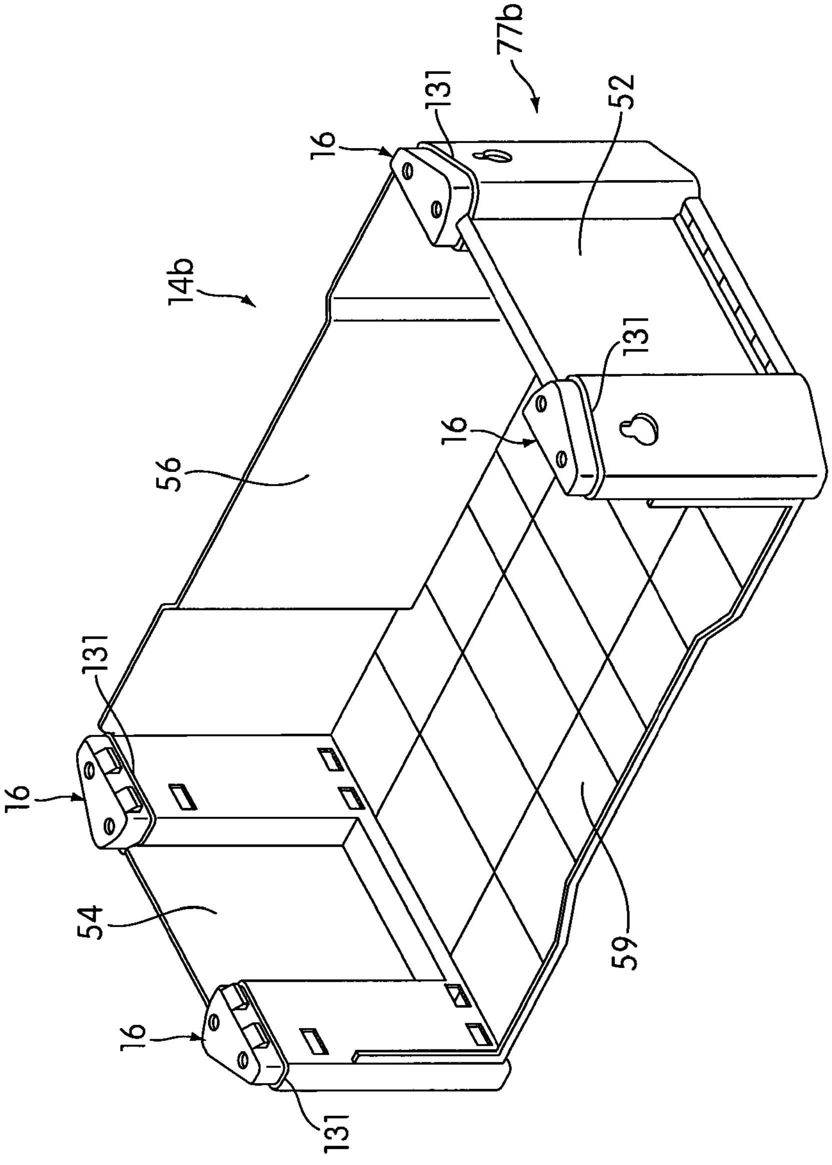
FIG. 7 is a perspective view of a part of the container module of the rolling container assembly in accordance with an embodiment.

FIG. 7 shows the storage container 14*b* with certain parts removed to better reveal others. In this embodiment, the container portion 77*b* of the storage container 14*b* includes four upper non-releasable connection portions 16 extending upwards from a ledge portion 131 of the container portion 77*b*. In one embodiment, the ledge 131 may be the same height as the side walls 52, 54 of the container portion 77*b*. The other storage containers may have the same configuration, or may have different configurations, as the storage container 14*b* shown in this Figure.

Figure 8B:
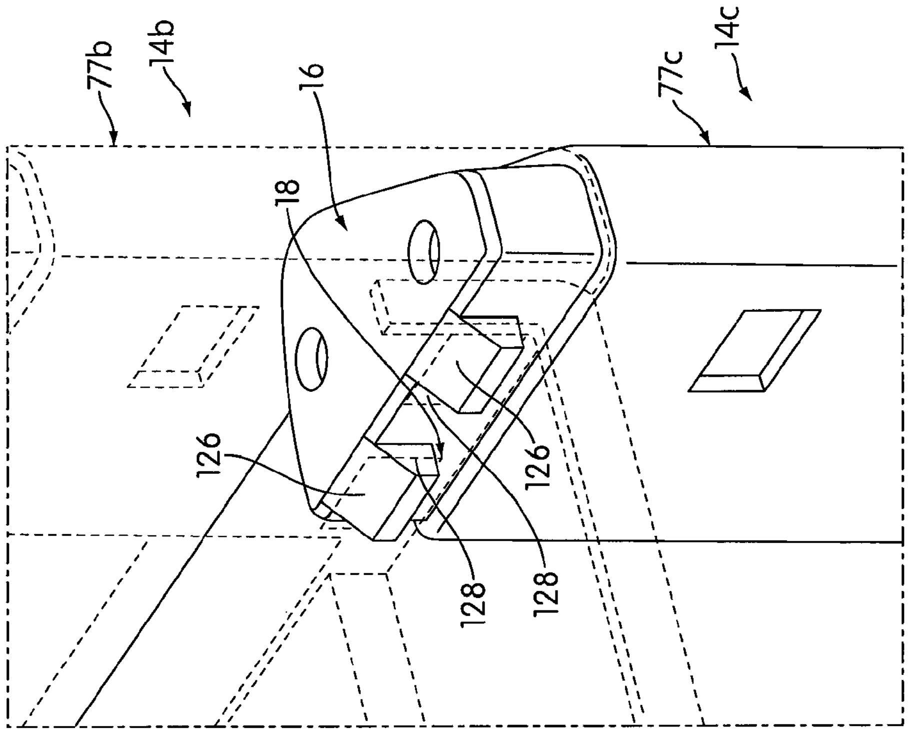
FIG. 8*b* is a detailed view of a non-releasable connection between storage containers of the rolling container assembly in accordance with an embodiment.
Figure 8A:
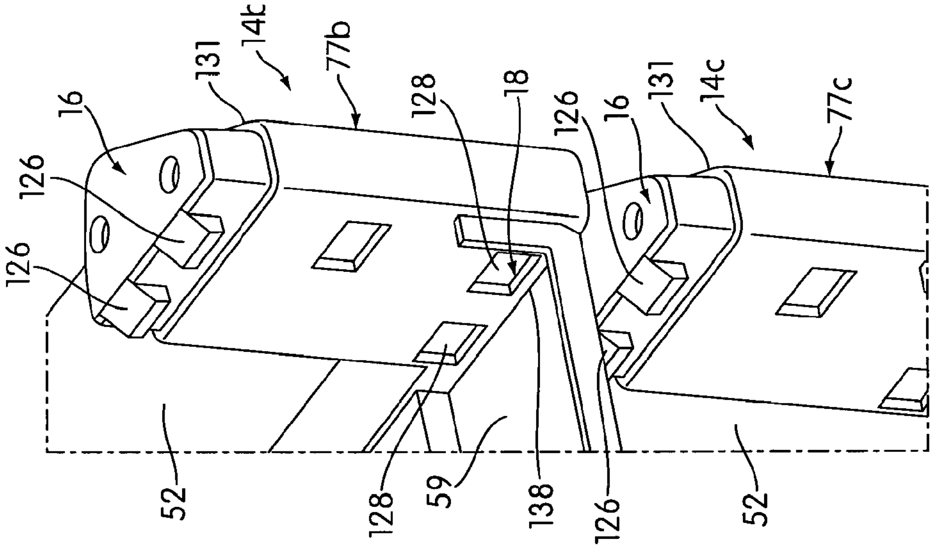
FIG. 8*a* is a detailed view of upper and lower non-releasable connection portions of storage containers of the rolling container assembly in accordance with an embodiment.

FIG. 8*a* is a detailed view of the upper and lower non-releasable connection portions 16, 18 of the storage containers 14*b*, 14*c*. In this embodiment, each of the upper non-releasable connection portions 16 of the storage containers 14*b*, 14*c* includes protrusions 126 (two in this embodiment) constructed and arranged to be received in openings 128 (two in this embodiment) when the storage containers 14*b*, 14*c* are non-releasably connected to each other. The lower non-releasable connection portion 18 of the storage container 14*b* may include a hollow space 141 (see FIG. 12) formed in the storage container 14*b* to receive the upper non-releasable connection portion 16 of the storage container 14*c*. It is contemplated that the upper and lower non-releasable portions 16, 18 may be interchanged in other embodiments, or may have different configurations in other embodiments. It is contemplated that the upper and lower non-releasable connection portions 16, 18 of the other storage containers may have the same configuration, or may have different configurations, as the upper and lower non-releasable connection portions 16, 18 shown in this Figure.

Figure 10:
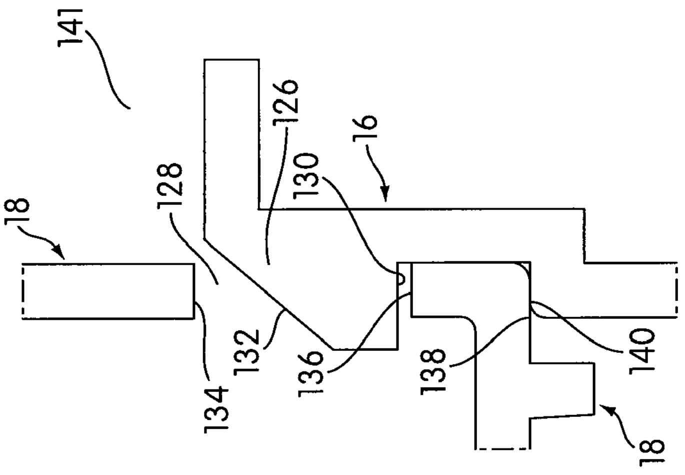
FIG. 10 is a detailed cross sectional side view of a non-releasable connection between storage containers of the rolling container assembly in accordance with an embodiment.

FIG. 8*b* shows in detail the non-releasable connection between the storage containers 14*b*, 14*c*, with the parts normally obstructed from view shown in dashed lines, and with certain parts removed to better reveal others. In this embodiment, the storage containers 14*b*, 14*c* are non-releasably connected using the upper non-releasable connection portion 16 of the storage container 14*c* and the lower non-releasable connection portion 18 of the storage container 14*b* In this embodiment, the protrusions 126 of the upper non-releasable connection portions 16 of the storage container 14*c* are received in the openings 128 of the lower non-releasable connection portions 18 of the storage container 14*b* to form the non-releasable connection. FIG. 10 shows the connection in more detail. As shown in FIG. 10, the protrusion 126 of the upper non-releasable connection portion 16 includes a stop surface 130 and an inclined contact portion 132. The lower non-releasable connection portion 18 includes an upper surface 134 and a lower surface 136 defining the opening 128. The lower surface 136 of the lower non-releasable connection portion 18 may be constructed and arranged to abut against the stop surface 130 of the protrusion 126 of the upper non-releasable connection portion 16 to prevent the lower non-releasable connection portion 18 from being disconnected from the upper non-releasable connection portion 16. The lower non-releasable connection portion 18 may also include a bottom surface 138 constructed and arranged to contact the contact surface 132 when the upper non-releasable connection portion 16 is being connected to the lower non-releasable connection portion 18, which will be described in more detail later. The bottom surface 138 may contact a ledge surface 140 of the upper non-releasable connection portion 16 when the lower and upper non-releasable portions 16, 18 are non-releasably connected to each other. Any portion or all of the upper and lower non-releasable connection portions 16, 18 may be made of resilient material. In one embodiment, the upper and lower non-releasable connection portions 16, 18 are made entirely of plastic. It should be appreciated that the upper and lower non-releasable connection portions 16, 18 may be made of other materials or a combination of materials. It is contemplated that the upper and lower non-releasable connection portions 16, 18 may have other configurations in other embodiments.

Figure 9B:
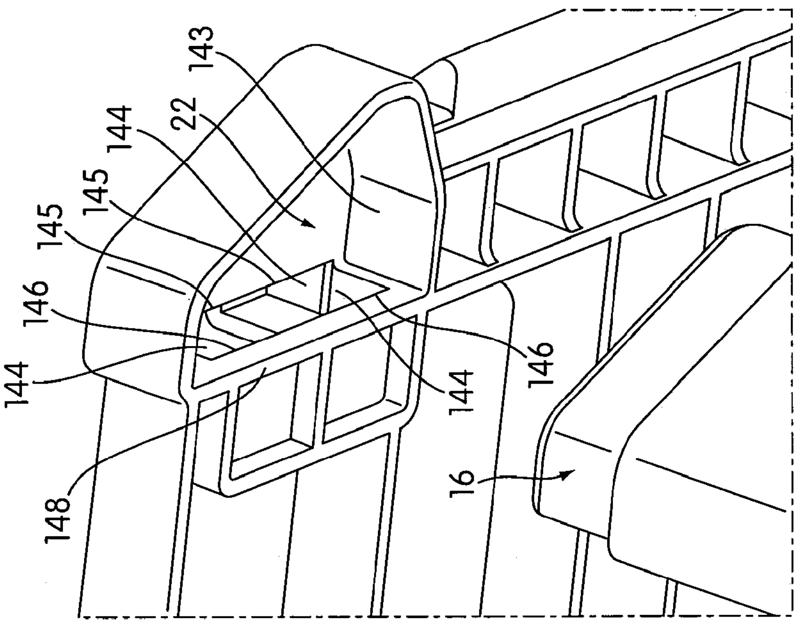
FIG. 9*b* is another detailed view of a non-releasable connection portion of a container top and upper non-releasable connection portion of a storage container of the rolling container assembly in accordance with an embodiment.
Figure 9A:
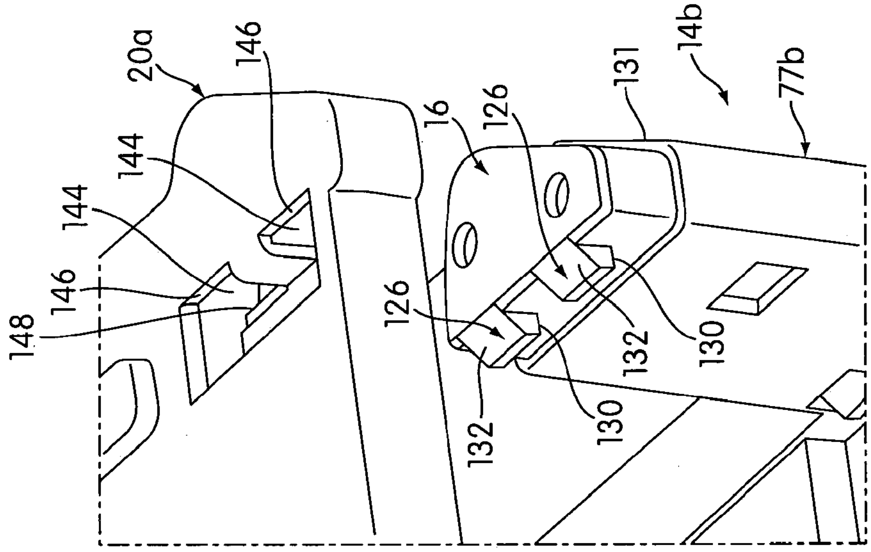
FIG. 9*a* is a detailed view of a non-releasable connection portion of a container top and upper non-releasable connection portion of a storage container of the rolling container assembly in accordance with an embodiment.

FIGS. 9*a*-9*b* show in detail the non-releasable connection portion 22 of the container top 20*a* and the upper non-releasable connection portion 16 of the storage container 14*b*. The non-releasable connection portion 22 may have a similar configuration as the lower non-releasable connection portions 18 of the storage containers. For example, as shown in FIG. 9*b*, the non-releasable connection portion may include a hollow space 143 constructed and arranged to receive at least portions of the upper non-releasable connection portion 16. Furthermore, the non-releasable connection portion 22 of the container top 20*a* may have openings 144 constructed and arranged to receive the protrusions 126 of the upper non-releasable connection portions 16. An upper surface 145 and a lower surface 146 of the non-releasable connection portion 22 define the opening 144. The non-releasable connection portion 22 may include a bottom surface 148 constructed and arranged to contact the inclined contact surface 132 of the upper non-releasable connection portions 16 when the upper non-releasable connection portions 16 are being non-releasably connected to the lower non-releasable connection portions 18, which will be described in more detail below. Thus, in one embodiment, the non-releasable connection portions 22 may have similar configurations and parts as the lower non-releasable connection portion 18 and may operate with the upper non-releasable connection 16 in a similar manner. That is, the connection between the non-releasable connection portion 22 and the upper non-releasable connection portion 16 may be similar to the connection shown in FIG. 10 between the lower and upper non-releasable connections 16, 18. Accordingly, this feature enables the manufacturer or others assembling the apparatus 10 to select the combination of storage containers and container tops to be non-releasably connected together to form container modules, as mentioned above.

Figure 9C:
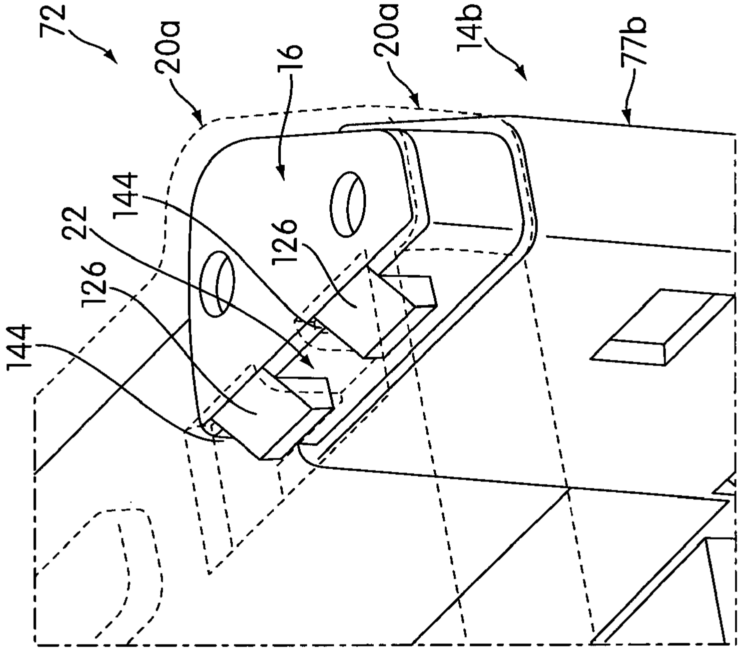
FIG. 9*c* is a detailed view of a non-releasable connection between a container top and a storage portion of the rolling container assembly in accordance with an embodiment.

FIG. 9*c* shows in detail the non-releasable connection between the container top 20*a* and the storage container 14*b*, with the parts normally obstructed from view shown in dashed lines, and with certain parts removed to better reveal others. In this embodiment, the container top 20*a* is non-releasably connected to the storage container 14*b* using the upper non-releasable connection portion 16 of the storage container 14*b* and the non-releasable connection portion 22 of the container top 20*a*. In this embodiment, the protrusions 126 of the upper non-releasable connection portions 16 of the storage container 14*b* are received in the openings 144 of the non-releasable connection portions 22 of the container top 20*a* to form the non-releasable connection.

Figure 11B:
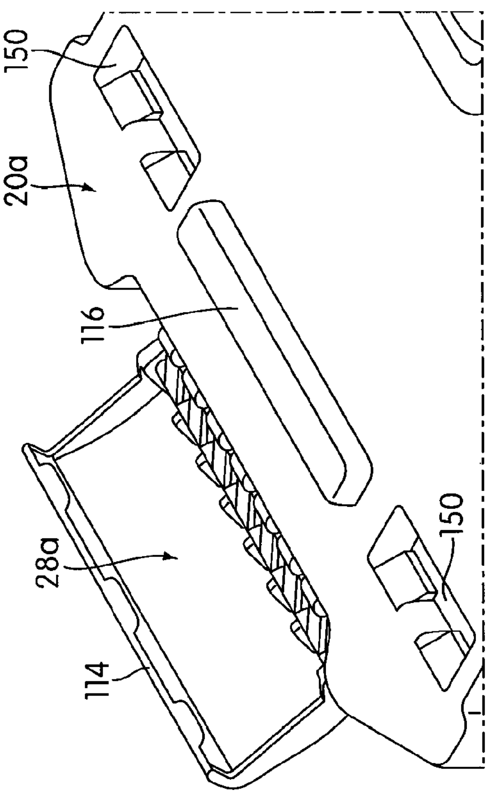
FIG. 11*b* is a perspective view from the top of a portion of a container module of the rolling container assembly in accordance with an embodiment.
Figure 11A:
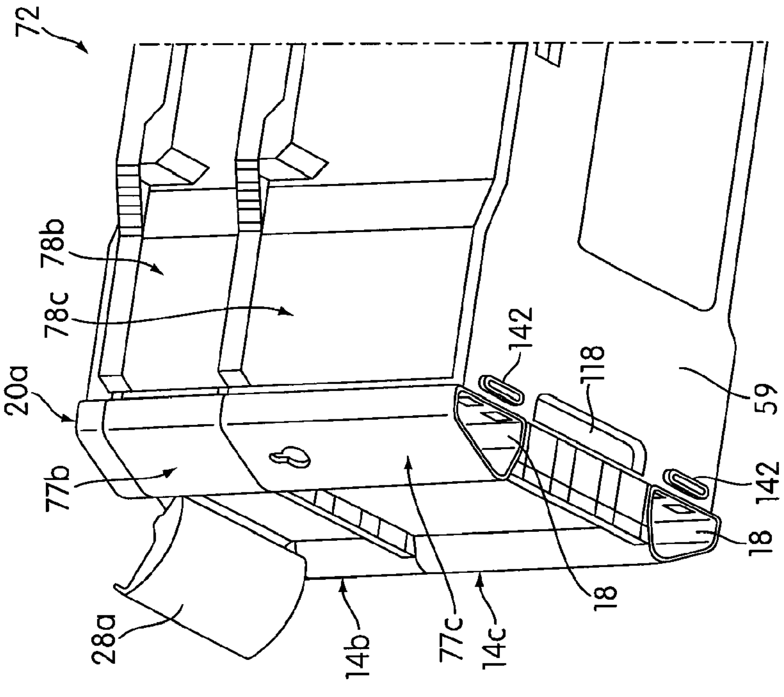
FIG. 11*a* is a perspective view from the bottom of a portion of a container module of the rolling container assembly in accordance with an embodiment.

FIG. 11*a* is a bottom perspective view of the middle container module 72 in accordance with an embodiment. In this embodiment, the storage container 14*c* includes the elongated recess 118 at the bottom side 59 thereof. The elongated recess 118 is constructed and arranged to receive the elongated protrusion 116 provided on the container top 20*a* (see FIG. 11*b*). As mentioned above, the elongated recesses 118 and the protrusions 116 facilitate the alignment of the latches 28*a*, 28*b* with the latch engaging structures 31. Feet 142 may extend from the bottom side 59 of the storage container 14*c* to facilitate placement of the storage container 14*c* on a surface. The other storage containers may also be provided with the feet 142 and the recesses 118. As shown in FIG. 11*b*, openings 150 may be provided on the container top 20*a* near or at the non-releasable connection portions 22. The openings 150 of the container top 20*a* may receive the feet 142 of the storage container placed above the container top 20*a*. The other container tops may have the same configuration as the container top 20*a*.

Figure 12:
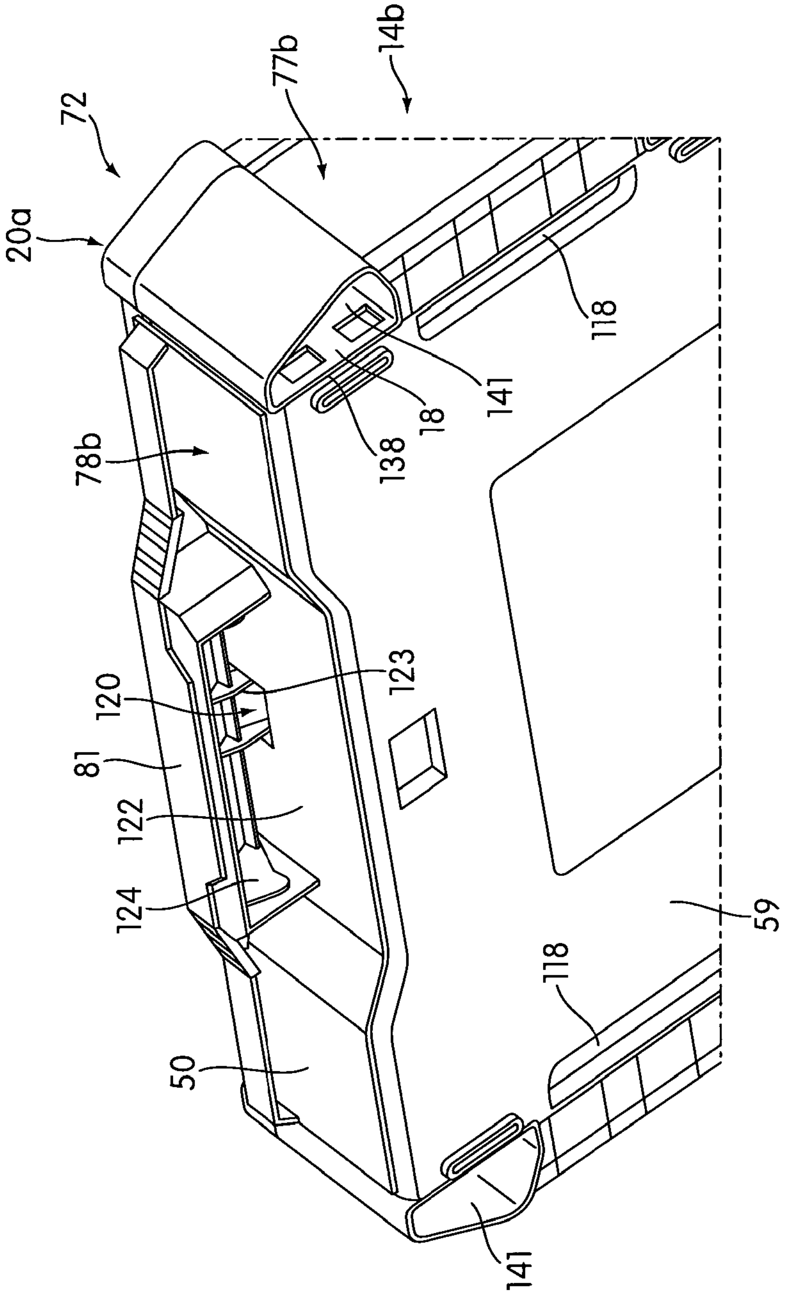
FIG. 12 is a perspective view from the bottom of a portion of a container module of the rolling container assembly in accordance with an embodiment.

The storage containers, container tops, base storage container, and top storage container may be non-releasably connected as follows in accordance with an embodiment. As mentioned above, the storage containers, container tops, base storage container, and top storage container may be non-releasably connected at any point before the assembly 10 is sold to the consumer or user. As shown in FIGS. 8*a*-8*b*, the storage container 14*b* may be non-releasably connected to the storage container 14*c*. To non-releasably connect the storage containers 14*b*, 14*c*, the lower non-releasable connection portions 18 of the storage container 14*b* may be aligned with the upper non-releasable connection portions 16 of the storage container 14*c*. The upper and lower non-releasable connection portions 16, 18 may then be moved towards one another such that the upper non-releasable connection portions 16 are received in the space 141 (as shown in FIG. 12) of the lower non-releasable connection portion 18. During this movement, referring to the parts shown in FIG. 10, the bottom surface 138 of the lower non-releasable connection portion 18 may contact and push against the inclined contact surface 132 of the protrusion 126 of the upper non-releasable connection portion 16. The lower non-releasable connection portion 18 and/or the upper non-releasable connection portion 16 may include resilient material that enables portions thereof to flex so that the protrusions 126 may be further received in the hollow space 141 of the lower non-releasable connection portion 18. The bottom surface 138 of the lower non-releasable connection portions 18 may move down along the contact surface 132 of the protrusions 126, whereupon the protrusions 126 snap into the openings 128 of the lower non-releasable connection portions 18. In one embodiment, the lower surface 136 of the lower non-releasable connection portion prevents the disengagement or disconnection of the non-releasable connection between the upper and lower connection portions 16, 18 by abutting against the stop surface 130 of the protrusion 126 of the upper non-releasable connection portion 16. When the storage containers 14*b*, 14*c* are non-releasably connected, the lower surface 138 of the lower non-releasable connection, portions 18 of the storage container 14*b* may rest on the ledge surface 140 of the storage container 14*c*. It should be appreciated that the other storage containers, base storage container, and top storage container may be non-releasably connected in a similar manner. Similarly, the container top 20*a* or other container tops may be connected to storage container 14*b* or other storage containers, base storage container, or top storage container in a similar manner.

After the storage containers, container tops, base storage container, and top storage container have been non-releasably connected to form container modules, the container modules may then be releasably connected to each other. For example, in the embodiment shown in FIG. 2, the upper container module 70 may be releasably connected to the middle container module 72 using latches 28*a*, and the middle container module 72 may be releasably connected to the lower container module 74 using latches 28*b*. To releasably connect container module 70 to container module 72, for example, the container module 70 may be placed above the container module 72. The container module 70 may then be brought closer to the container module 72 until the elongated protrusions 116 of the container top 20*a* of container module 72 are received in the elongated recesses 118 of the storage container 14*a* of container module 70. Accordingly, the container module 70 rests on the container module 72 and the latches 28*a* that are pivotally connected to the container top 20*a* of the container module 72 are aligned with the latch engaging structures 31 provided on the storage container 14*a* of container module 70. The latches 28*a* may then be pivoted upwards from a lowered position (see for example FIG. 5) upwards towards the storage container 14*a* until the upper engaging members 114 of the latches 28*a* are engaged with the latch engaging structures 31. Accordingly, the container modules 70 and 72 are releasably connected to one another (see for example, FIG. 1*a*). To release the connection between the container modules 70 and 72, the user may pivot the latches 28*a* downwards so that the upper engaging members is released from engagement with the latch engaging structures 31. The container module 70 may then be separately carried from container module 72. It should be appreciated that other container modules may be releasably connected or disconnected in a similar manner as the container modules 70, 72 described above. The container module 72 may be releasably connected to the lower container module 74 in a similar manner using the latches 28*b*.

FIG. 12 shows a bottom perspective view of the storage container 14*b*. In this embodiment, an opening 122 is formed under the latch shield 81 to provide access to an actuating portion 124 of the latch member 120. An opening 123 may be provided in the front wall 50 of the drawer to enable a portion of the latch member 120 to pass therethrough. The actuating portion 124 is constructed and arranged to be actuatable by the user to move release the engaging portion 119 from engagement with the latch engaging member 121, which will be described in more detail below. The latch shield 81 of the other storage containers may have the same configuration, and the latch shield 86 of the base storage container 26 may have the same configuration as the latch shield 81.

Figure 13A:
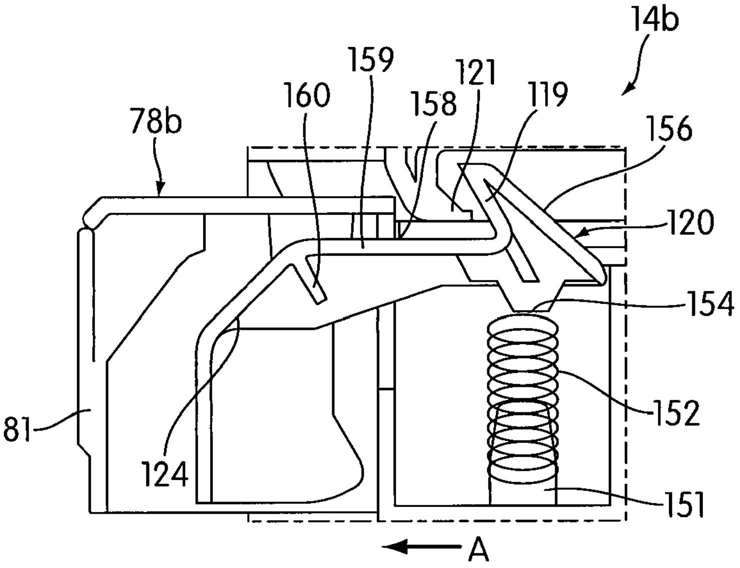
FIG. 13*a*-13*b* are detailed side views of a drawer latch of the rolling container assembly in an engaged position and a disengaged position, respectively, in accordance with an embodiment.

FIG. 13*a* shows the engaging portion 119 of the latch member 120 in the first position and engaged with the latch engaging member 121. As mentioned above, in the first position, the engaging portion 119 is engageable with the latch engaging member 121 to latch the drawer 78*b* in the closed position to prevent sliding movement of the drawer 78*b*. The latch member 120 may be pivotally connected to the drawer 78*b* at a pivot point 160.

In this embodiment, the latch member 120 is biased upwards by a biasing member 152, taking the form of a compression spring in this embodiment. The biasing member 152 contacts a contact portion 154 of the latch member 120 and pushes the engaging portion 119 upwards towards the latch engaging member 121. The biasing member 152 may be provided on a protrusion 151 extending upwards from the drawer 78*b*. The latch member 120 may also include a cam surface 156 near or at the engaging portion 119. The cam surface 156 is constructed and arranged to contact a contact surface 158 during sliding movement of the drawer 78*b* to the closed position, which will be described in more detail later. The latch member 120 may also include an upper surface 159 that may contact the contact surface 158 during sliding movement of the drawer 78*b* to the closed position. The contact surface 158 may be an edge or any other portion of the container top or storage container disposed above and connected to the storage container 14*b*. In this embodiment, the latch engaging member 121 prevents the drawer 78*b* from being slid in the direction of A by engaging with the engaging portion 119, which takes the form of a hook in this embodiment.

Figure 13B:
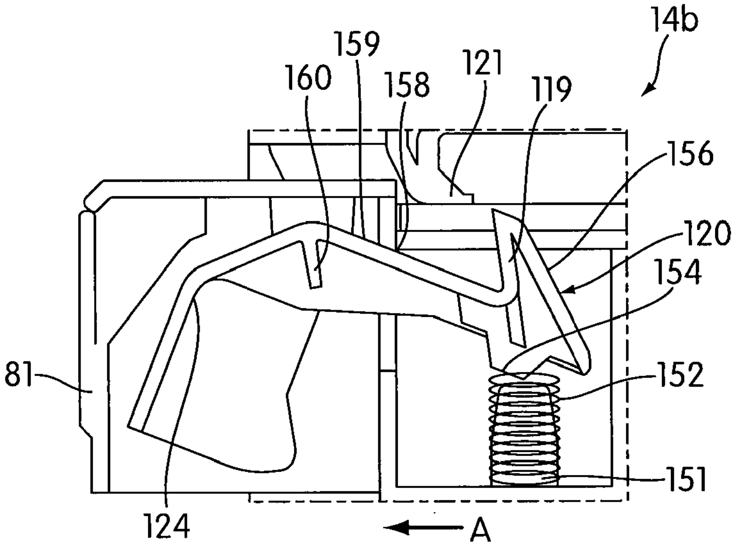

FIG. 13*b* shows the latch member 120 in the second position and disengaged from the latch engaging member 121. As mentioned above, in the second position, the latch member 120 is releasable from engagement with the latch engaging member 121 to permit sliding movement of the drawer 78*b*. As shown in this embodiment, when the latch member 120 is in the second position, the latch member 120 is pivoted downwards in the clockwise direction such that the engaging portion 119 is removed from engagement with the latch engaging member 121 and the contact portion 154 is pushed against the biasing member 152, thus compressing the biasing member 152. The actuation portion 124 is constructed and arranged to receive the user's fingers during pivoting of the latch member 120 from the first position to the second position. The latch members 120 of the other storage containers and the latch member 108 of the base storage container 26 may have the same configuration as the latch member 120 described above and may operate in a similar manner.

Figure 14A:
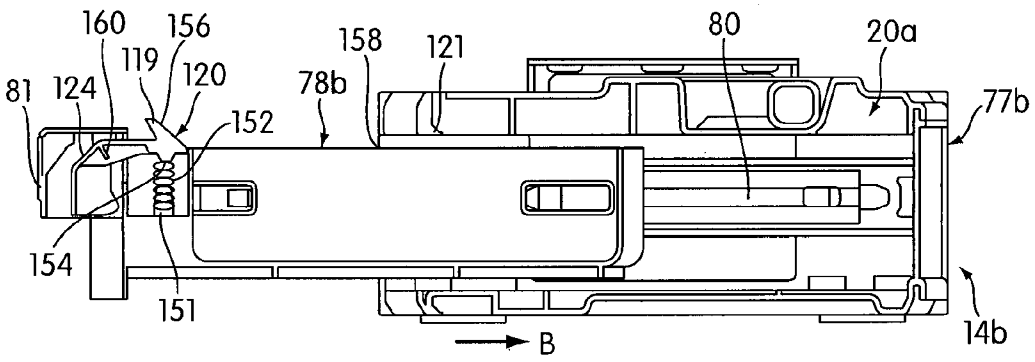
FIG. 14*a*-14*c* illustrate positions of the latch during movement of the drawer between an open and closed position in accordance with an embodiment.
Figure 14B:
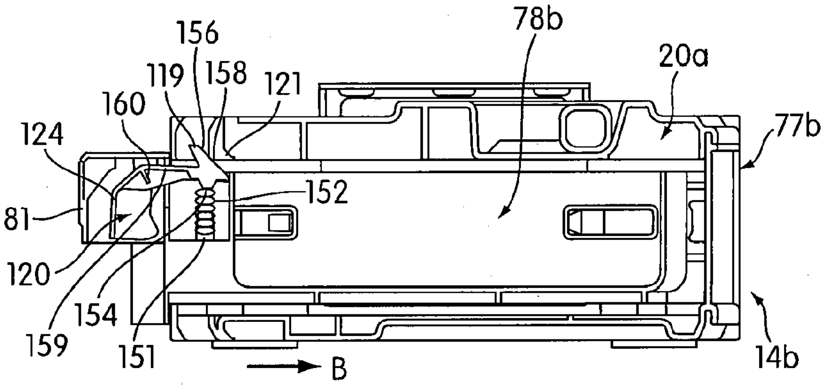
Figure 14C:
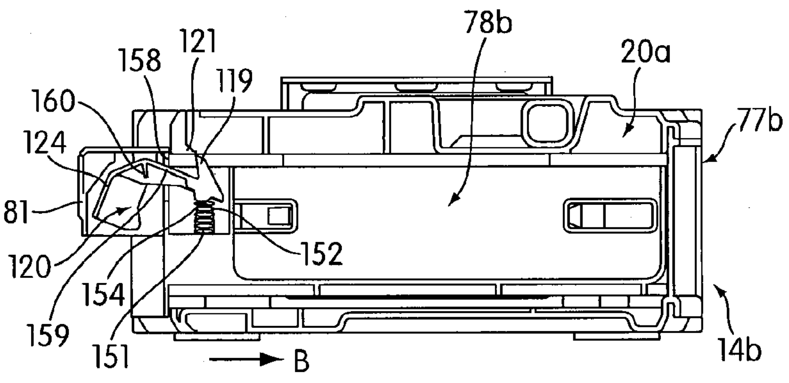
Figure 15A:
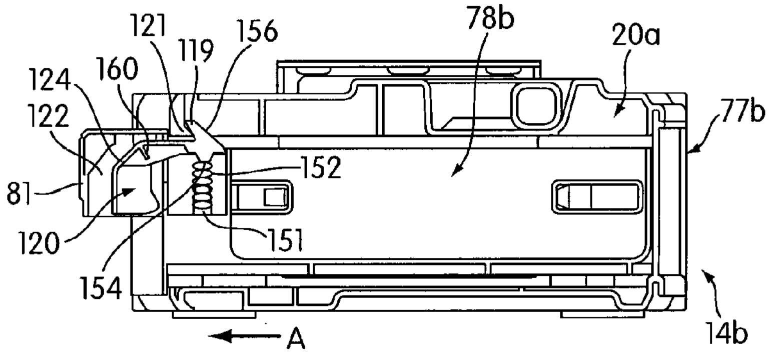
FIG. 15*a*-15*c* illustrate positions of the latch during movement of the drawer between the closed and open positions in accordance with an embodiment.

FIGS. 14*a*-14*c* illustrate the operation of sliding the drawer from the open position wherein access to contents of the drawer 78*b* are permitted to the closed position wherein access to the contents of the drawer are prevented in accordance with an embodiment. In this embodiment, the user may push the latch shield 81 to slide the drawer 78*b* towards the closed position (e.g., in the direction of B). The drawer 78*b* may be in the open position initially, as shown in FIG. 14*a*. In the embodiment shown in FIGS. 14*a*-14*c*, the latch engaging member 121 is provided on the container top 20*a*. The user may push against the latch shield 81 to slide the drawer 78*b* towards the closed position, as shown in FIG. 14*b*. During this sliding movement, the cam surface 156 of the latch member 120 may push against the contact surface 158 provided on the container top 20*a*, as shown in FIG. 14*b*. This may cause the latch member 160 to pivot downwards along pivot point 160. Accordingly, the contact portion 154 of the latch member 120 may push against the biasing member 152. As the drawer 78*b* is further slid towards the closed position, the contact surface 158 may contact the upper surface 159 of the latch member 120, as shown in FIG. 14*c*, and may cause the latch member 120 to pivot further downwards such that the contact portion 154 of the latch member 120 further compresses the biasing member 152. As the drawer 78*b* is pushed further in the direction of B, the latch member 120 may clear the contact surface 158 and may snap upwards in the counterclockwise direction due to the bias of the biasing member 152, causing the hook-shaped engaging portion 119 to be engaged with the latch engaging member 121, as shown in FIG. 15*a*. Thus, the drawer 78*b* is locked in the closed position. Accordingly, in the operation described above, the latch shield 81 may shield the latch member 120 from the user such that the user does not have to access the latch member 120 to lock the drawer 78*b* in the closed position. In other words, the drawer 78*b* can be locked "automatically" by the user pushing the drawer 78 from the open position to the closed position via the latch shield 81.

Figure 15B:
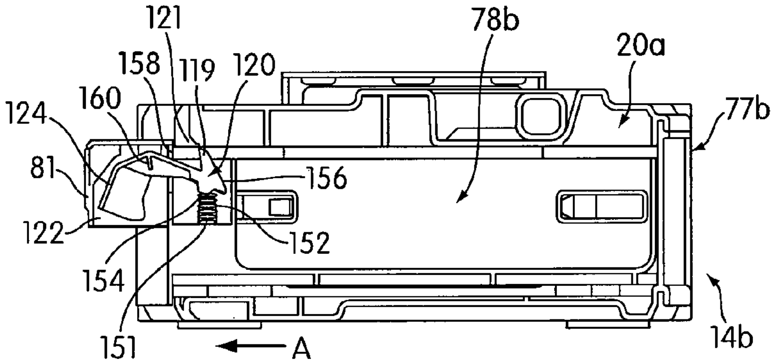
Figure 15C:
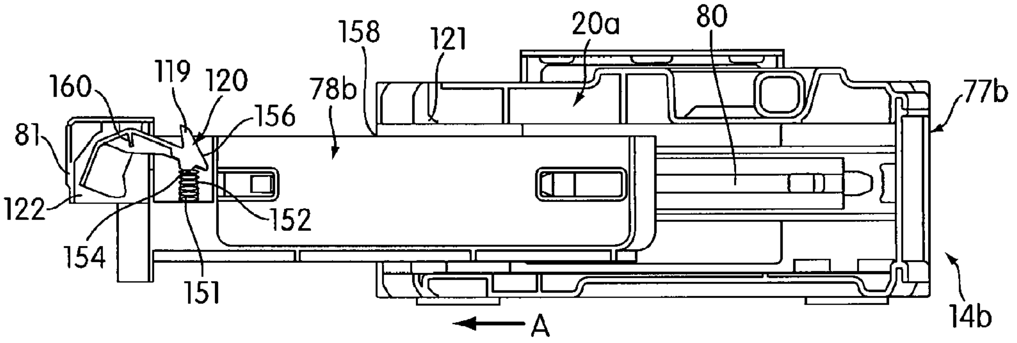

The drawer 78*b* may be unlocked and slid to the open position as follows. The drawer 78*b* may initially be locked in the closed position, as shown in FIG. 15*a*, wherein the engaging portion 119 of the latch member 120 is engaged with the latch engaging member 121 provided on the container top 20*a*. In this position, the biasing member 152 is biasing the engaging portion 119 upwards so that it is engaged with the latch engaging member 121. The user may insert fingers into the opening 122 formed by the latch shield 81 to access the actuating portion 124 of the latch member 120. The user may push the actuating portion 124 upwards to pivot the latch member 120 along the pivot point 160. As a result, the latch member 120 may be pivoted downwards in the clockwise direction such that the engaging portion 119 is removed from engagement with the latch engaging member 121, and the contact portion 154 is compressing the biasing member 152 downwards, as shown in FIG. 15*b*. After the engaging portion 119 has been moved downward and disengaged from the latch engaging member 121 and the drawer 78*b* is unlocked, the user may pull the drawer 78*b* towards the open position (e.g., in the direction of A), as shown in FIG. 15*c*. After the user ceases actuation of the actuating portion 124, the biasing member 152 may snap the latch member 120 upwards in the counterclockwise direction to the position shown in FIG. 14*a*. As mentioned above, the other drawers may be locked/unlocked and moved between the open and closed positions in a similar manner. The latch member 108 may operate in a similar manner as latch member 120 to latch the bin 82 in the closed position. However, instead of sliding movement, the bin 82 may be pivoted between the open and closed positions.

Figure 16A:
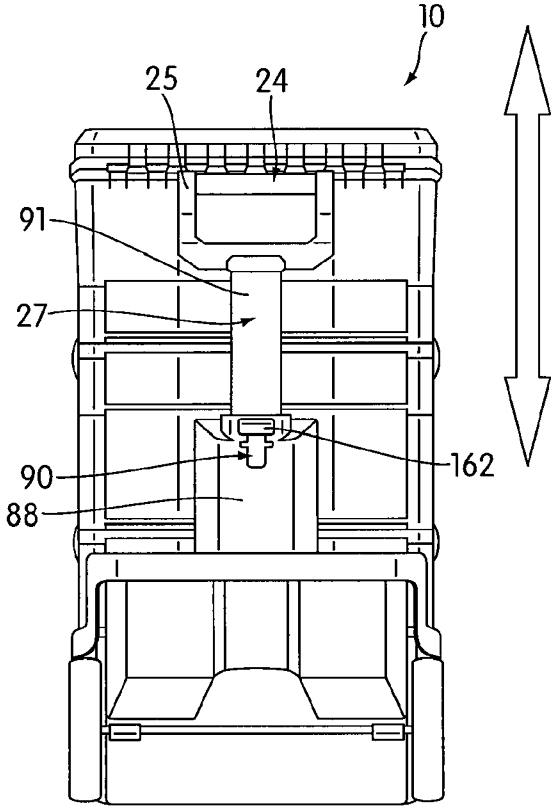
FIG. 16*a*-16*b* illustrate rear plan views of the rolling container assembly in accordance with an embodiment.
Figure 16B:
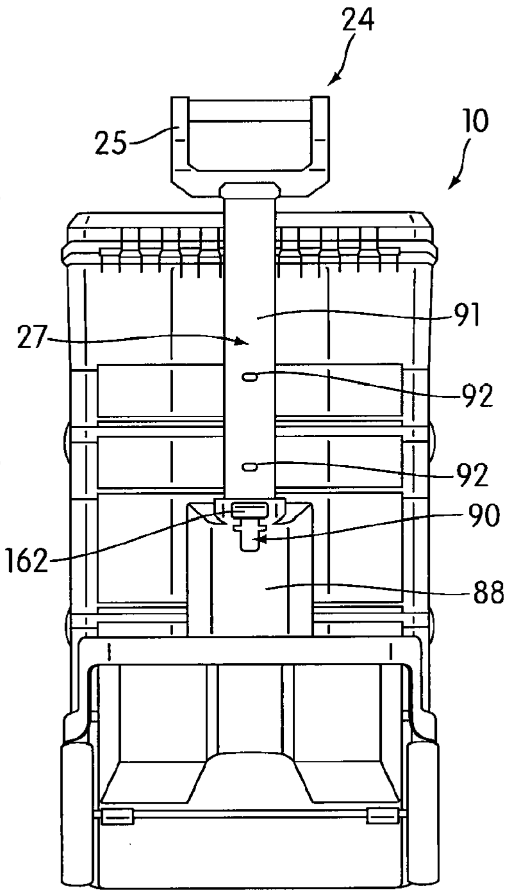
Figure 17:
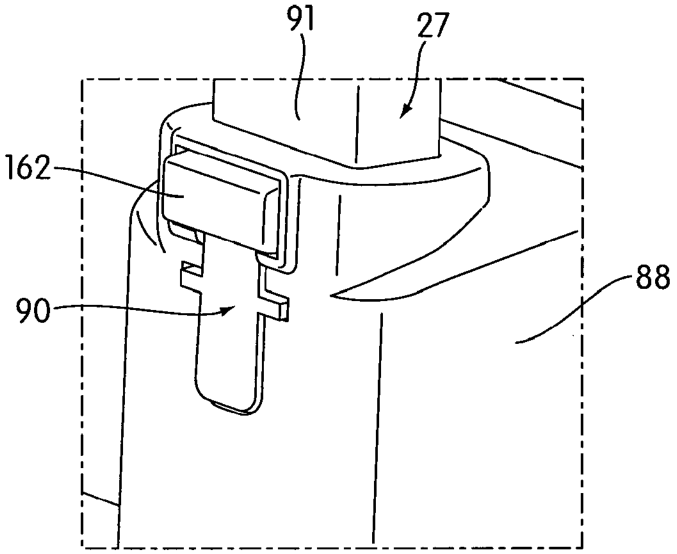
FIG. 17 illustrates a detailed view of a handle latch of the rolling container assembly in accordance with an embodiment.

FIGS. 16*a*-16*b* illustrate rear plan views of the assembly 10. In FIG. 16*a*, the pulling handle 24 is retracted in the handle receiving portion 88. A handle lock 90 is provided on the handle receiving portion 88. As mentioned above, the handle lock 90, which may take the form of a rocker, is constructed and arranged to be moveable between 1) a locked position wherein the pulling handle 24 is locked at a selected position such that sliding movement of the pulling handle 24 between the retracted position and the extended position is prevented and 2) an unlocked position wherein sliding movement of the pulling handle 24 between the retracted position and the extended position is permitted. The handle lock 90 may engage with one of the plurality of openings 92 provided in the extension bar 27 when the pulling handle 27 is in the locked position. FIG. 17 shows the handle lock 90 in more detail. In this embodiment, the handle lock 90 includes an actuation portion 162 constructed and arranged to be actuatable to move the handle lock 90 to the disengaged position. In some embodiments, the handle lock 90 may be a type of rocker lock that pivots or rocks about a pivot point.

Figure 18:
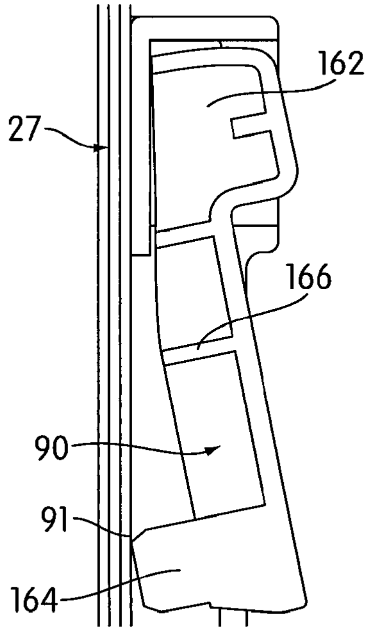
FIG. 18 illustrates a detailed side view of the handle latch in accordance with an embodiment.

FIG. 18 shows a side view of the handle lock 90 in the unlocked position. The handle lock 90 includes the actuation portion 162 and an engagement portion 164, which takes the form of a protrusion in this embodiment, that is constructed and arranged to be received in one of the openings 92 when the handle lock 90 is in the locked position such that sliding movement of the pulling handle 24 between the retracted and extended positions is prevented. That is, to lock the handle lock 90 in the locked position in one embodiment, the engagement portion 164 is received in one of the openings 92. To unlock the handle lock 90, the engagement portion 164 is removed from the openings 92. A pivot axis 166, which may be defined by a pivot pin, is provided between the actuation portion 162 and the engagement portion 164. Accordingly, the lock handle 90 may "rock" along the pivot axis 166. The actuation portion and the engagement portion 164 may be integrally formed or may be separate pieces connected to each other to form the handle lock 90.

Figure 19A:
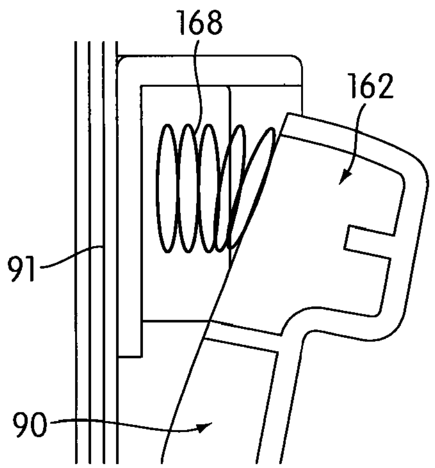
FIG. 19*a*-19*b* illustrates a detailed side view of the handle latch in the locked position/unactuated position and in the unlocked/actuated position, respectively, in accordance with an embodiment.
Figure 19B:
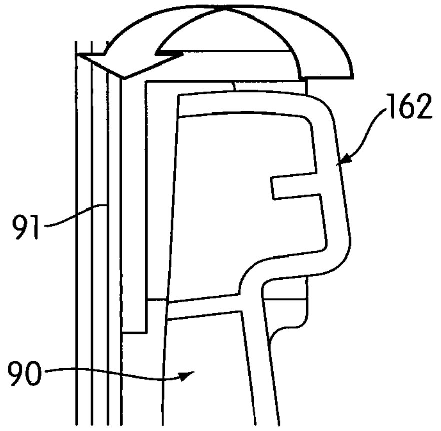

FIG. 19*a* shows a detailed side view of the actuation portion 162 of the handle lock 90. A biasing member 168 biases the handle lock 90 in the locked position. In this embodiment, the biasing member 168 contacts at least a portion of the actuation portion 162 of the handle lock 90. The actuation portion 162 of the handle lock 90 is actuatable against the bias of the biasing member 168 to pivot the lock to the unlocked position, as shown in FIGS. 18 and 19*b*. It should be appreciated that in other embodiments, the biasing member 168 may be located at other locations and/or may take other forms.

The pulling handle 24 may be slid to adjust the height of the handle portion 24 as follows in accordance with an embodiment. The handle lock 90 may initially be biased in the unactuated and locked position, as shown in FIG. 19*a*. When the handle lock 90 is in this position, the engagement portion 164 is received in one of the openings 92 to lock the pulling handle 24 at a selected position such that sliding movement of the pulling handle 24 is prevented. The user may push the actuation portion 162 of the handle 90 against the bias of the biasing member 168 to the actuated position, as shown in FIGS. 18 and 19*b*. This may cause the handle lock 90 to pivot in the counterclockwise direction. Accordingly, the engagement portion 164 is removed from the opening 92. The pulling handle 24 may then be slid up/down between the retracted and extended positions with respect to the handle receiving portion 88. After the desired position of the pulling handle 24 has been selected and an opening 92 is aligned with the engagement portion 164, the user may release actuation of the actuation portion 162, whereupon the biasing member 168 may snap the actuation portion 162 in the clockwise direction back to the unactuated position shown in FIG. 19*a*. Accordingly, the engagement portion 164 of the handle lock 90 may be received in the selected opening 92 to lock the pulling handle 24 at the selected position. Alternatively, the user might not have to align an opening 92 with the engagement portion 164. For example, the user may cease actuation of the actuation portion 162 regardless of the alignment of an opening 92 with the engagement portion 164. To lock the handle lock 90, the user may then proceed to move the pulling handle 24 up or down. The contact between the engagement portion 164 and the surface 91 of the extension bar 27 prevents the handle lock 90 from being moved back to the locked position. Accordingly, the handle lock 90 may be in the unlocked position, as shown in FIG. 18. As the user moves the pulling handle 24 up or down, one of the openings 92 may become aligned with the engagement portion 164, whereupon the biasing member 168 may snap the handle lock 90 in the clockwise direction so that the engagement portion 164 is received in the opening 92 that is aligned therewith. Accordingly, the pulling handle 90 is once again locked in the selected position.

As mentioned above, it should be appreciated that the rolling container assembly 10 may include any number of container modules that are releasably connected together using latches. The container modules may have a variety of configurations, and any combination of storage containers, container tops, base storage containers, and top storage containers may be non-releasably connected together to form the container modules.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

What is claimed is:

1. A container module, comprising:

a container top having a non-releasable connection portion;

a storage container comprising: an upper non-releasable connection portion and a lower non-releasable connection portion, the upper non-releasable connection portion being constructed and arranged to be selectively non-releasably connectable to 1) a lower non-releasable connection portion of at least one other storage container or 2) the non-releasable connection portion of the container top, and the lower non-releasable connection portion being constructed and arranged to be selectively non-releasably connectable to an upper non-releasable connection portion of the at least one other storage container, wherein when the container top is non-releasably connected to the upper non-releasable connection portion of the storage container, the container top closes off an upper opening of the storage container; and a latch constructed and arranged to releasably connect the storage container to the at least one other storage container if the at least one other storage container is positioned on the container top.

2. The container module of claim 1, wherein the latch is disposed on the container top and constructed and arranged to be releasably connected to a latch engaging structure defined on the storage container positioned above the container top.

3. The container module of claim 1, wherein the lower non-releasable portion of the storage container has the same configuration as the lower non-releasable portion of the container top.

4. The container module of claim 1, wherein the latch member is pivotally connected to the container top and is pivotable upwards to releasably connect to a latch engaging structure defined on the storage container positioned above the container top.

5. The container module of claim 1, wherein the upper non-releasable connection portion is non-releasably connected to the lower non-releasable connection portion via a snap-fit connection.

6. The container module of claim 1, wherein the lower non-releasable connection portion comprises openings constructed and arranged to receive protrusions of the upper non-releasable connection portion when the lower non-releasable connection portion is non-releasably connected to the upper non-releasable connection portion.

7. The container module of claim 1, wherein the storage container comprises a sliding drawer.

8. The container module of claim 1, wherein the storage container comprises a pivotable bin.

9. An apparatus for transporting articles between working locations, comprising:

one or more rotatable ground engaging wheels mounted toward the bottom of the apparatus for rotation about an axis to provide rolling support for the apparatus;

at least two storage containers constructed and arranged to be selectively releasably or non-releasably connected to one another, each storage container comprising an upper non-releasable connection portion and a lower non-releasable connection portion, wherein the upper non-releasable connection portion of one of the storage containers is constructed and arranged to be selectively non-releasably connected to the lower non-releasable connection portion of the other of the storage containers, and the lower non-releasable connection portion of the one of the storage containers is constructed and arranged to be selectively non-releasably connected to the upper non-releasable connection portion of the other of the storage containers;

a container top having a non-releasable connection portion constructed and arranged to be selectively non-releasably connected to the upper non-releasable connection portion of either of the storage containers, and wherein the connection between the non-releasable connection portion of the container top and the upper non-releasable connection portion of one of the storage containers 1) prevents the one of the storage containers that is non-releasably connected to the container top from being non-releasably connected to the other of the storage containers disposed above the container top and 2) permits the one of the storage containers that is non-releasably connected to the container top to be releasably connected to the other of the storage containers disposed above the container top;

a releasable latch that releasably latches the one of the storage containers that is non-releasably connected to the container top to be releasably connected to the other of the storage containers disposed above the container top; and a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

10. The apparatus of claim 9, wherein the releasable connection is provided by a latch connected to the container top.

11. The apparatus of claim 10, wherein the latch comprises a latch member constructed and arranged to be releasably connected to a latch engaging structure defined on the other of the storage containers disposed above the container top.

12. The apparatus of claim 9, wherein the upper non-releasable connection portion is non-releasably connected to the lower non-releasable connection portion via snap-fit connection.

13. The apparatus of claim 9, wherein the lower non-releasable connection portion comprises openings constructed and arranged to receive protrusions of the upper non-releasable connection portion when the lower non-releasable connection portion is non-releasably connected to the upper non-releasable connection portion.

14. The apparatus of claim 9, wherein at least one of the at least two storage containers comprises sliding drawers.

15. The apparatus of claim 9, further comprising a base storage container and a base container top, the base storage container being non-releasably connected to the base container top, and the base container top being releasably connected to one of the at least two storage containers disposed above the base container top.

16. The apparatus of claim 9, further comprising a base storage container having the upper non-releasable connection portion, the base storage container being constructed and arranged to be selectively releasably connected or non-releasably connected to one of the at least two storage containers.

17. The apparatus of claim 16, further comprising a base container top, the base container top being selectively non-releasably connected to the base storage container so as to prevent the base storage container to be non-releasably connected to one of the at least two storage containers and permit the base storage container to be releasably connected to one of the at least two storage containers.

18. The apparatus of claim 16, wherein the base storage container comprises a pivotable bin.

19. The apparatus of claim 9, further comprising a top storage container having the lower non-releasable connection portions constructed and arranged to be selectively non-releasably connected to the upper non-releasable connection portions of one of the at least two storage containers.

20. The apparatus of claim 19, wherein the top storage container comprises a pivotable lid and a container portion.

21. A container comprising:

a container portion;

a storage portion constructed and arranged to be received in the container portion, the storage portion being moveable between an open position wherein access to contents of the storage portion is permitted and a closed position wherein access to the contents of the storage portion is prevented, the storage portion comprising: a front wall, a rear wall, and side walls, the front wall including a latch shield engageable by the user to push the storage portion from the open position to the closed position; and a latch member at least partially shielded by the latch shield and constructed and arranged to latch the storage portion in the closed position, the latch member comprising:

an engaging portion constructed and arranged to engage with a latch engaging member, the engaging portion being biased upwards in a first position wherein the engaging portion is engageable with the latch engaging member to latch the storage portion in the closed position, wherein movement of the storage portion from the open position to the closed position effects engagement of the engaging portion with the latch engaging member; and an actuating portion actuatable by the user to move the engaging portion downward to a second position wherein the latch member is released from engagement with the latch engaging member to permit sliding movement of the storage portion.

22. The container of claim 21, further comprising a container top constructed and arranged to be connected to the container portion, and wherein the latch engaging member is provided on the container top.

23. The container of claim 21, wherein the latch engaging member is provided on another container disposed above and connected to the container.

24. The container of claim 21, further comprising a biasing member disposed below the engaging portion, and wherein the engaging portion is biased upwards by the biasing member.

25. The container of claim 24, wherein the actuatable portion is actuatable by the user to pivot the latch member downwards against the bias of the biasing member so as release the engaging portion from engagement with the latch engaging member.

26. The container of claim 24, wherein the biasing member is a compression spring.

27. The container of claim 21, wherein the actuating portion and the engaging portion of the latch member are integrally formed.

28. The container of claim 21, wherein the storage portion is a drawer, and wherein the latch member is pivotally connected to the drawer behind the latch shield.

29. An apparatus for transporting articles between working locations, comprising:

at least one container having an interior space in which articles to be transported can be stored;

one or more rotatable ground engaging wheels mounted toward the bottom of the apparatus for rotation about an axis to provide rolling support for the apparatus;

an adjustable pulling handle slideable between a retracted position and an extended position, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction; and a rocker lock constructed and arranged to be moveable between 1) a locked position wherein the pulling handle is locked at a selected position such that sliding movement of the pulling handle between the retracted position and the extended position is prevented and 2) an unlocked position wherein sliding movement of pulling handle between the retracted position and the extended position is permitted, wherein the rocker lock has a first portion and a second portion, the rocker lock having a pivot axis provided between the first portion and the second portion, and a biasing member that biases the rocker lock towards the locked position and is actuatable against the bias of the biasing member to pivot the rocker lock to the unlocked position, and wherein the second portion is constructed and arranged to lock the pulling handle when the rocker lock is in the locked position.

30. The apparatus of claim 29, wherein the first portion and the second portion are integrally formed.

31. The apparatus of claim 29, wherein the pulling handle comprises a handle portion constructed and arranged to be engageable by a user and an extension bar connected to the handle portion.

32. The apparatus of claim 31, wherein the extension bar comprises a plurality of openings and wherein the second portion of the rocker lock comprises a protrusion constructed and arranged to be received in one of the plurality of openings of the extension bar when the rocker lock is in the locked position.

33. The apparatus of claim 31, wherein the extension bar is telescopically received in a receiving portion of the apparatus.

34. The apparatus of claim 29, wherein the rocker lock is pivotable between the locked and unlocked positions.

35. A container module comprising:

a container top having a non-releasable connection portion of a first type;

a storage container having an upper portion with a non-releasable connection portion of a second type, which is non-releasably connectable with the non-releasable connection portion of the first type so that the upper portion can be connected to the container top; the storage container having a lower portion with a) a non-releasable connection portion of the first type to enable the lower portion to be non-releasably connectable to an upper portion of at least one other storage container, and b) a releasable connection portion, wherein when the container top is non-releasably connected to the non-releasable connection portion of the second type on the upper portion of the storage container, the container top closes off an upper opening of the storage container; and a releasable latch enabling a releasable connection of the storage container to the at least one other storage container.

36. The container module of claim 35, wherein the at least one other storage container has the same configuration as the storage container.

37. The container module of claim 35, wherein the at least one other storage container has a different configuration from the storage container.

38. The container module of claim 35, wherein the releasable latch is connected to the container top.

39. A container system comprising:

an upper container having a lower non-releasable connection portion;

a lower container having an upper non-releasable connection portion;

a container top disposed between the upper and lower containers, the container top having a lower non-releasable connection portion that is non-releasably connected to upper non-releasable connection portion of the lower container; and a releasable latch for releasably connecting the container top to the upper containers;

wherein the lower non-releasable connection portion of the upper container bears against the container top and is retained in said bearing relationship by the releasable latch, but remains unconnected to the container top, the lower non-releasable connecting portion of the upper container being configured for non-releasable locking engagement with the upper non-releasable connection portion of the lower container, but spaced therefrom by the container top and thus unconnected thereto.

* * * * *